(12) United States Patent
Soma et al.

(10) Patent No.: US 8,008,869 B2
(45) Date of Patent: Aug. 30, 2011

(54) DISCHARGE LAMP LIGHTING DEVICE, CONTROL METHOD FOR THE SAME, AND PROJECTOR

(75) Inventors: Shigeyasu Soma, Muroran (JP); Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 390 days.

(21) Appl. No.: 12/404,395

(22) Filed: Mar. 16, 2009

(65) Prior Publication Data

US 2009/0237624 A1  Sep. 24, 2009

(30) Foreign Application Priority Data

Mar. 19, 2008 (JP) ................................. 2008-071834

(51) Int. Cl.
*G05F 1/00* (2006.01)
*H05B 37/02* (2006.01)
*H05B 39/04* (2006.01)
*H05B 41/36* (2006.01)

(52) U.S. Cl. .................... 315/291; 315/209 R; 315/308; 315/DIG. 7

(58) Field of Classification Search ........................ None
See application file for complete search history.

(56) References Cited

U.S. PATENT DOCUMENTS

| 6,815,907 | B2 | 11/2004 | Riederer |
| 7,622,869 | B2 | 11/2009 | Watanabe et al. |
| 2002/0041165 | A1* | 4/2002 | Cammack ....................... 315/291 |
| 2009/0121640 | A1* | 5/2009 | Ootsuka et al. ................ 315/129 |
| 2010/0084988 | A1* | 4/2010 | Nagata et al. .................. 315/246 |

FOREIGN PATENT DOCUMENTS

| EP | 1768468 A | 3/2007 |
| JP | 2003-243195 A | 8/2003 |
| JP | 2005-327744 A | 11/2005 |
| JP | 2006-120654 A | 5/2006 |
| JP | 2007-115660 A | 5/2007 |

* cited by examiner

*Primary Examiner* — Anh Tran
(74) *Attorney, Agent, or Firm* — AdvantEdge Law Group, LLC

(57) ABSTRACT

A discharge lamp lighting device includes: a power control circuit that outputs a DC current; an AC converter circuit that takes the DC current as its input, inverts polarity of the DC current between first polarity and second polarity in predetermined timing, and thereby generates and outputs an AC current for discharge lamp driving; and a control unit that carries out AC conversion control processing to the AC converter circuit to control polarity inversion timing of the AC current for discharge lamp driving, and current control processing to the power control circuit to control a current value of the DC current. The control unit carries out repair control to change, in a first cyclical pattern, cumulative energy supplied to each electrode of a discharge lamp during one cycle of the AC current for discharge lamp driving, in predetermined timing. The first cyclical pattern includes plural sectional periods in which the cumulative energy is maintained at the same value over plural cycles of the AC current for discharge lamp driving. The cumulative energy differs between at least two of the sectional periods.

15 Claims, 18 Drawing Sheets

DISCHARGE LAMP LIGHTING DEVICE, CONTROL METHOD FOR THE SAME, AND PROJECTOR

BACKGROUND

1. Technical Field

The present invention relates to a discharge lamp lighting device, a control method for the same, and a projector.

2. Related Art

As a light source of a projector, a discharge lamp such as a high-pressure mercury lamp or metal halide lamp is used. In such a discharge lamp, wear of electrodes due to discharge causes change in the shape of the electrodes. If plural protrusions are grown at the distal end of the electrodes or irregular wear of the electrode bodies progresses, shift of arc starting point and change in arc length occur. These phenomena cause reduction in luminance of the discharge lamp and shorten the life of the discharge lamp. This is not desirable.

As a method to address this problem, U.S. Pat. No. 6,815,907 proposes a technique of pulse width modulation with the absolute value of an AC current for discharge lamp driving maintained substantially at a constant level.

However, in U.S. Pat. No. 6,815,907, pulse width modulation of an AC current for discharge lamp driving is carried out in one modulation pattern. When the variation range of pulse width modulation is set to be large enough to sufficiently melt a protrusion grown at the distal end of an electrode, excessive heat load is applied to an electrode having no protrusion grown at its distal end, and this accelerates wear of the electrode. On the contrary, when pulse width modulation is carried out to such an extent that excessive heat load is not applied to the electrode having no protrusion grown at its distal end, if the protrusion at the distal end of the electrode becomes harder to melt because of increase in cumulative lighting time of the electrode and so on, the unwanted protrusion on the electrode cannot be melted, thus making it difficult to sufficiently restrain occurrence of flicker.

SUMMARY

An advantage of some aspects of the invention is that a discharge lamp lighting device, a control method for the same, and a projector can be provided which enable restraining occurrence of flicker while reducing heat load on a discharge lamp electrode.

According to an aspect of the invention, a discharge lamp lighting device includes: a power control circuit that outputs a DC current; an AC converter circuit that takes the DC current as its input, inverts polarity of the DC current between first polarity and second polarity in predetermined timing, and thereby generates and outputs an AC current for discharge lamp driving; and a control unit that carries out AC conversion control processing to the AC converter circuit to control polarity inversion timing of the AC current for discharge lamp driving, and current control processing to the power control circuit to control a current value of the DC current. The control unit carries out repair control to change, in a first cyclical pattern, cumulative energy supplied to each electrode of a discharge lamp during one cycle of the AC current for discharge lamp driving, in predetermined timing. The first cyclical pattern includes plural sectional periods in which the cumulative energy is maintained at the same value over plural cycles of the AC current for discharge lamp driving. The cumulative energy differs between at least two of the sectional periods.

According to this aspect, since repair control is carried out in predetermined timing, while heat load on the discharge lamp electrodes is reduced, the temperature of the electrode can be properly changed and uneven wear of the electrodes and uneven precipitation of electrode material can be prevented. Moreover, by repair control, unwanted protrusions on the electrode can be melted. Thus, occurrence of flicker can be restrained.

The cumulative energy is energy equivalent to the electric energy supplied from the discharge lamp lighting device during a period when each electrode is an anode.

The predetermined timing may be, for example, periodical timing or timing when occurrence of flicker is detected.

According to another aspect of the invention, a discharge lamp lighting device includes: a power control circuit that outputs a DC current; an AC converter circuit that takes the DC current as its input, inverts polarity of the DC current between first polarity and second polarity in predetermined timing, and thereby generates and outputs an AC current for discharge lamp driving; and a control unit that carries out AC conversion control processing to the AC converter circuit to control a duty ratio by polarity inversion timing of the AC current for discharge lamp driving, and current control processing to the power control circuit to control a current value of the DC current. The control unit carries out repair control to conduct current control processing to change, in a first cyclical pattern, a duty ratio that is a proportion of time of the first polarity in one cycle of the AC current for discharge lamp driving, in predetermined timing. The first cyclical pattern includes plural sectional periods in which the duty ratio is maintained at the same value over plural cycles of the AC current for discharge lamp driving. The duty ratio differs between at least two of the sectional periods.

According to this aspect, since repair control is carried out in predetermined timing, while heat load on the discharge lamp electrodes is reduced, the temperature of the electrode can be properly changed and uneven wear of the electrodes and uneven precipitation of electrode material can be prevented. Moreover, by repair control, unwanted protrusions on the electrode can be melted. Thus, occurrence of flicker can be restrained.

The duty ratio is the proportion of time of the first polarity in one cycle of the AC current for discharge lamp driving that is inverted between the first polarity and the second polarity.

According to still another aspect of the invention, a discharge lamp lighting device includes: a power control circuit that outputs a DC current; an AC converter circuit that takes the DC current as its input, inverts polarity of the DC current between first polarity and second polarity in predetermined timing, and thereby generates and outputs an AC current for discharge lamp driving; and a control unit that carries out AC conversion control processing to the AC converter circuit to control polarity inversion timing of the AC current for discharge lamp driving, and sectional current control processing to the power control circuit to control a current value of the DC current in accordance with the polarity inversion timing section. The control unit carries out repair control to conduct the sectional current control processing to change, in a first cyclical pattern, a difference in absolute value between a current value in a first polarity section and a current value in a second polarity section of the AC current for discharge lamp driving, in predetermined timing. The first cyclical pattern includes plural sectional periods in which the difference in absolute value between the current value in the first polarity section and the current value in the second polarity section of the AC current for discharge lamp driving is maintained at the same value over plural cycles of the AC current for discharge lamp driving. The difference in absolute value between the current value in the first polarity section and the current value in the second polarity section of the AC current for discharge lamp driving differs between at least two of the sectional periods.

According to this aspect, since repair control is carried out in predetermined timing, while heat load on the discharge lamp electrodes is reduced, the temperature of the electrode can be properly changed and uneven wear of the electrodes and uneven precipitation of electrode material can be prevented. Moreover, by repair control, unwanted protrusions on the electrode can be melted. Thus, occurrence of flicker can be restrained.

It is preferable that in other cases than the time of the repair control, the control unit carries out stationary control to control magnitude of the cumulative energy in a second cyclical pattern, whereas in the repair control, the control unit controls magnitude of the cumulative energy in the first cyclical pattern in which a difference between a maximum value and a minimum value of the cumulative energy is greater than in the stationary control.

It is also preferable that in other cases than the time of the repair control, control unit carries out stationary control to control the duty ratio in a second cyclical pattern, whereas in the repair control, the control unit controls the duty ratio in the first cyclical pattern in which a difference between a maximum value and a minimum value of the duty ratio is greater than in the stationary control.

It is also preferable that in other cases than the time of repair control, the control unit carries out stationary control to control, in a second cyclical pattern, the difference in absolute value between the current value in the first polarity section and the current value in the second polarity section of the AC current for discharge lamp driving, whereas in the repair control, the control unit controls the difference between the current value in the first polarity section and the current value in the second polarity section of the AC current for discharge lamp driving, in the first cyclical pattern in which a difference between a maximum value and a minimum value of the difference in absolute value between the current value in the first polarity section and the current value in the second polarity section of the AC current for discharge lamp driving is greater than in the stationary control.

It is also preferable that the control unit carries out the repair control in the cyclical pattern including a sectional period of a shorter time than the time per sectional period in the stationary control.

It is also preferable that the control unit carries out the repair control in periodical timing.

It is also preferable that the discharge lamp lighting device includes a flicker detecting unit that detects flicker in accordance with a discharge lamp driving voltage, and that the control unit carries out the repair control based on flicker detection timing of the flicker detecting unit.

It is also preferable that the control unit determines a flicker generating electrode in accordance with the flicker detection timing of the flicker detecting unit, and carries out the repair control to change the cumulative energy supplied when the flicker generating electrode is an anode, in the cyclical pattern to increase the cumulative energy.

For example, in this discharge lamp lighting device, the control unit may determine a flicker generating electrode in accordance with the flicker detection timing of the flicker detecting unit and may carry out repair control to change the duty ratio in the cyclical pattern so that the time of the flicker generating electrode being an anode becomes longer.

Alternatively, for example, in this discharge lamp lighting device, the control unit may determine a flicker generating electrode in accordance with the flicker detection timing of the flicker detecting unit and may carry out the repair control to change the DC current in a section where the flicker generating electrode is an anode, in the cyclical pattern to increase the DC current.

It is also preferable that the discharge lamp lighting device includes a flicker detecting unit that detects flicker in accordance with light quantity of the discharge lamp, and that the control unit carries out the repair control in accordance with flicker detection timing of the flicker detecting unit.

It is also preferable that the control unit carries out sectional current control processing in which the current value of the DC current in the polarity inversion timing section is at maximum in the latter half of the polarity inversion timing section.

It is also preferable that the control unit carries out sectional current control processing in which the current value of the DC current is monotonically increased within the polarity inversion timing section.

According to still another aspect of the invention, a control method is for a discharge lamp lighting device including a power control circuit that outputs a DC current, and an AC converter circuit that takes the DC current as its input, repeats polarity inversion of the DC current between first polarity and second polarity in predetermined timing and thereby generates and outputs an AC current for discharge lamp driving. The method includes carrying out AC conversion control processing to the AC conversion circuit to control polarity inversion timing of the AC current for discharge lamp driving, carrying out current control processing to the power control circuit to control a current value of the DC current, and carrying out repair control to change, in a first cyclical pattern, cumulative energy supplied to each electrode of the discharge lamp during one cycle of the AC current for discharge lamp driving, in predetermined timing. The first cyclical pattern includes plural sectional periods in which the cumulative energy is maintained at the same value over plural cycles of the AC current for discharge lamp driving. The cumulative energy differs between at least two of the sectional periods.

According to still another aspect of the invention, a projector includes the above discharge lamp lighting device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail with reference to the drawings. The following embodiment should not unduly limit the contents of the invention described in claims. Moreover, all the elements of the configuration described below do not necessarily constitute essential elements of the invention.

1. Optical System of Projector

Figure 1:
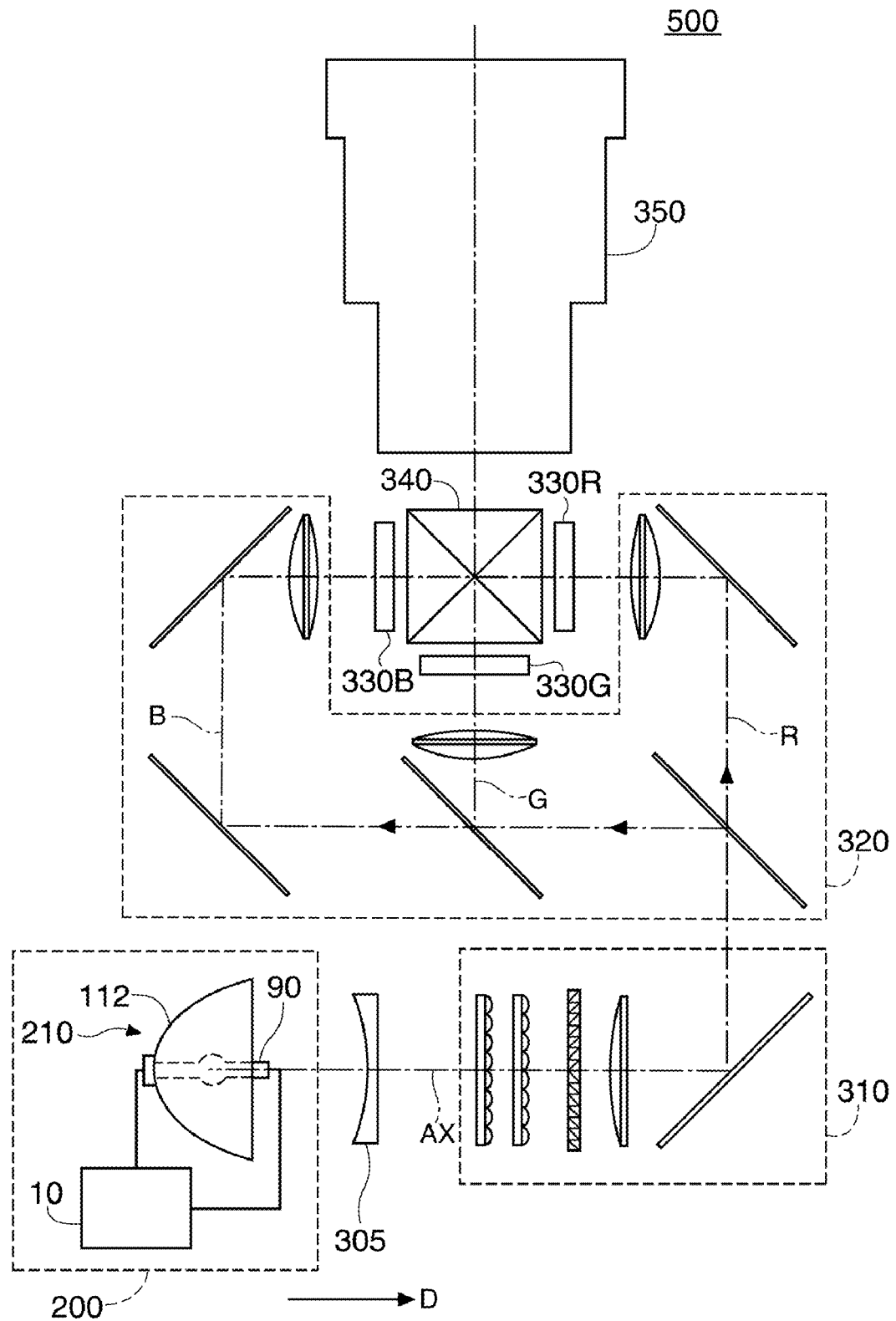
FIG. 1 is a view for explaining an optical system of a projector according an embodiment of the invention.

FIG. 1 is an explanatory view showing a projector 500 as an exemplary embodiment of the invention. The projector 500 has a light source 200, a parallelizing lens 305, an illumination system 310, a color separation system 320, three liquid crystal light valves 330R, 330G and 330B, a cross dichroic prism 340, and a projection system 350.

The light source 200 has a light source unit 210 and a discharge lamp lighting device 10. The light source unit 210 has a main reflection mirror 112 and a discharge lamp 90. The discharge lamp lighting device 10 supplies power to the discharge lamp 90 and thus lights the discharge lamp 90. The main reflection mirror 112 reflects the light emitted from the discharge lamp 90 toward an irradiation direction D. The irradiation direction D is parallel to an optical axis AX. The light from the light source unit 210 passes through the parallelizing lens 305 and becomes incident on the illumination system 310. This parallelizing lens 305 parallelizes the light from the light source unit 210.

The illumination system 310 equalizes the illuminance of the light from the light source 200 at the liquid crystal light valves 330R, 330G and 330B. The illumination system 310 also aligns the polarization direction of the light from the light source 200 into one direction. The reason for this is to effectively utilize the light from the light source 200 at the liquid crystal light valves 330R, 330G and 330B. The light with its illuminance distribution and polarization direction adjusted becomes incident on the color separation system 320. The color separation system 320 separates the incident light into three color light beams, that is, red (R), green (G) and blue (B). The three color light beams are modulated by the liquid crystal light valves 330R, 330G and 330B corresponding to their respective colors. The liquid crystal light valves 330R, 330G and 330B have liquid crystal panels 560R, 560G and 560B, and polarizers arranged on the light incident side and light exiting side of the liquid crystal panels 560R, 560G and 560B, respectively. The modulated three color light beams are combined by the cross dichroic prism 340. The combined light becomes incident on the projection system 350. The projection system 350 projects the incident light to a screen, not shown. Thus, an image is displayed on the screen.

For the configuration of each of the parallelizing lens 305, the illumination system 310, the color separation system 320, the cross dichroic prism 340, and the projection system 350, various known configuration can be employed.

Figure 2:
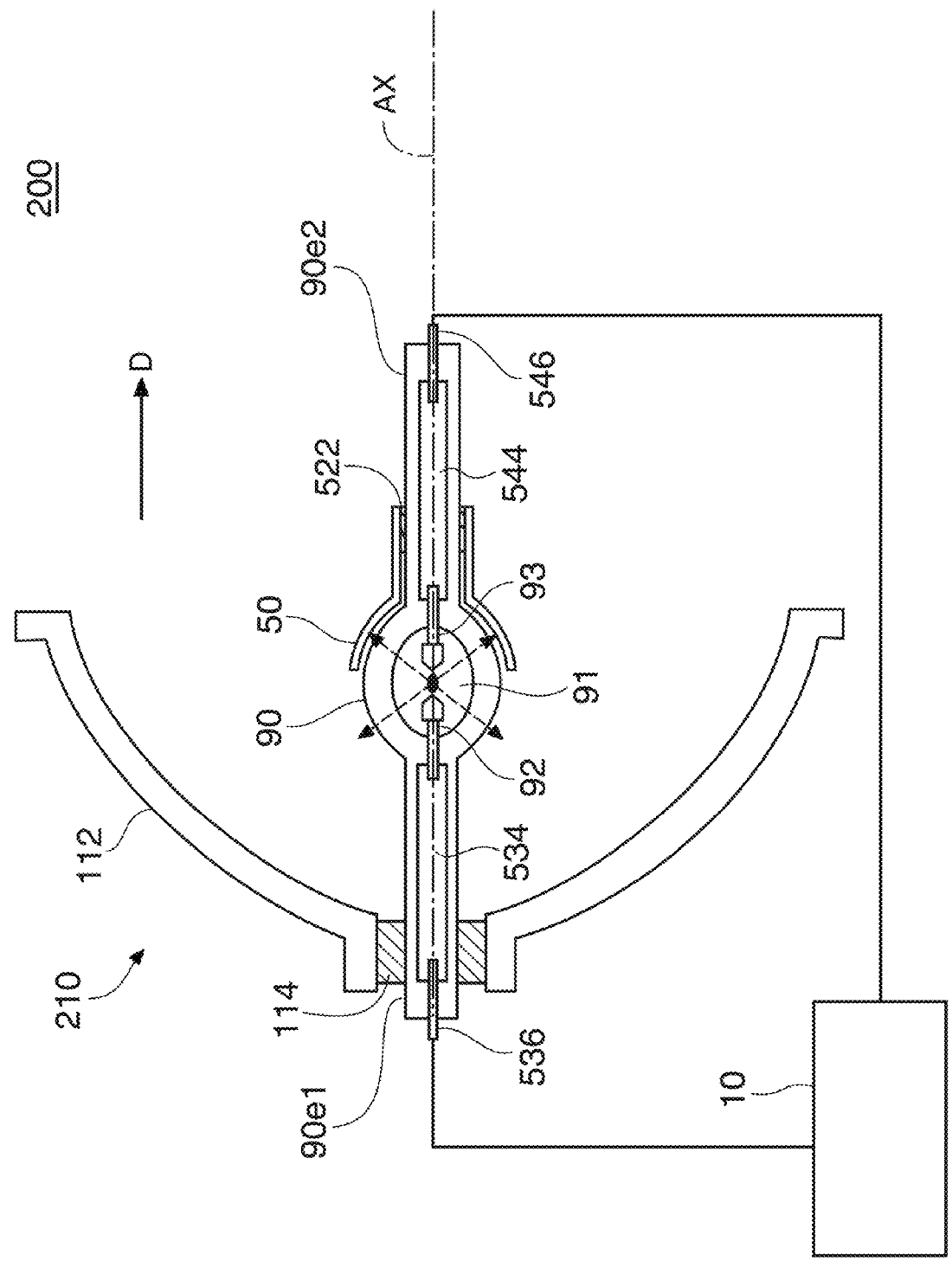
FIG. 2 is a view for explaining an optical system of a projector according to an embodiment of the invention.

FIG. 2 is an explanatory view showing the configuration of the light source 200. The light source 200 has the light source unit 210 and the discharge lamp lighting device 10. FIG. 2 shows a sectional view of the light source unit 210. The light source unit 210 has the main reflection mirror 112, the discharge lamp 90, and a sub reflection mirror 50.

The discharge lamp 90 has a bar-shape extending along the irradiation direction D from a first edge 90e1 to a second edge 90e2. The material of the discharge lamp 90 is a light-transmissive material such as quartz glass. A central part of the discharge lamp 90 is expanded in a spherical shape, in which a discharge space 91 is formed. A gas as a discharge medium containing rare gas, metal halide and so is sealed in the discharge space 91.

In the discharge space 91, two electrodes 92 and 93 are protruding from the discharge lamp 90. The first electrode 92 is arranged on the first edge 90e1 side in the discharge space 91 and the second electrode 93 is arranged on the second edge 90e2 side in the discharge space 91. These electrodes 92 and 93 have a bar-shape extending along the optical axis AX. In the discharge space 91, the distal ends (also referred to as "electrode tips") of the electrodes 92 and 93 face each other at a predetermined distance from each other. The material of the electrodes 92 and 93 is a metal such as tungsten.

A first terminal 536 is provided at the first edge 90e1 of the discharge lamp 90. The first terminal 536 and the first electrode 92 are electrically connected with each other by a conductive member 534 passing through the discharge lamp 90. Similarly, a second terminal 546 is provided at the second edge 90e2 of the discharge lamp 90. The second terminal 546 and the second electrode 93 are electrically connected with each other by a conductive member 544 passing through the discharge lamp 90. The material of the terminals 536 and 546 is a metal such as tungsten. As the conductive members 534 and 544, for example, molybdenum foils are used.

The terminals 536 and 546 are connected to the discharge lamp lighting device 10. The discharge lamp lighting device 10 supplies an AC current to these terminals 536 and 546. As a result, arc discharge occurs between the two electrodes 92 and 93. Light (discharge light) generated by the arc discharge is radiated in all directions from the discharge position, as indicated by dotted arrows.

The main reflection mirror 112 is fixed at the first edge 90e1 of the discharge lamp 90 by a fixing member 114. The reflection surface (the surface on the discharge lamp 90 side) of the main reflection mirror 112 has a spheroidal shape. The main reflection mirror 112 reflects the discharge light toward the irradiation direction D. The shape of the reflection surface of the main reflection mirror 112 is not limited to a spheroidal shape. Various shapes that reflect the discharge light toward the irradiation direction D can be employed. For example, the shape of a paraboloid of revolution may be employed. In such case, the main reflection mirror 112 can convert the discharge light to light substantially parallel to the optical axis AX. Therefore, the parallelizing lens 305 can be omitted.

The sub reflection mirror 50 is fixed to the second edge 90e2 side of the discharge lamp 90 by a fixing member 522. The reflection surface (the surface on the discharge lamp 90 side) of the sub reflection mirror 50 has a spherical shape surrounding the second edge 90e2 side of the discharge space 91. The sub reflection mirror 50 reflects the discharge light toward the main reflection mirror 112. Thus, the efficiency of utilization of the light radiated from the discharge space 91 can be enhanced.

As the material of the fixing members 114 and 522, an arbitrary heat-resistant material that can withstand heat generation of the discharge lamp 90 (for example, an inorganic adhesive) can be employed. The technique of fixing the arrangement of the main reflection mirror 112, the sub reflection mirror 50 and the discharge lamp 90 is not limited to fixing the main reflection mirror 112 and the sub reflection mirror 50 to the discharge lamp 90, and an arbitrary technique can be employed. For example, the discharge lamp 90 and the main reflection mirror 112 may be separately fixed to the casing of the projector (not shown). This also applies to the sub reflection mirror 50.

Figure 3:
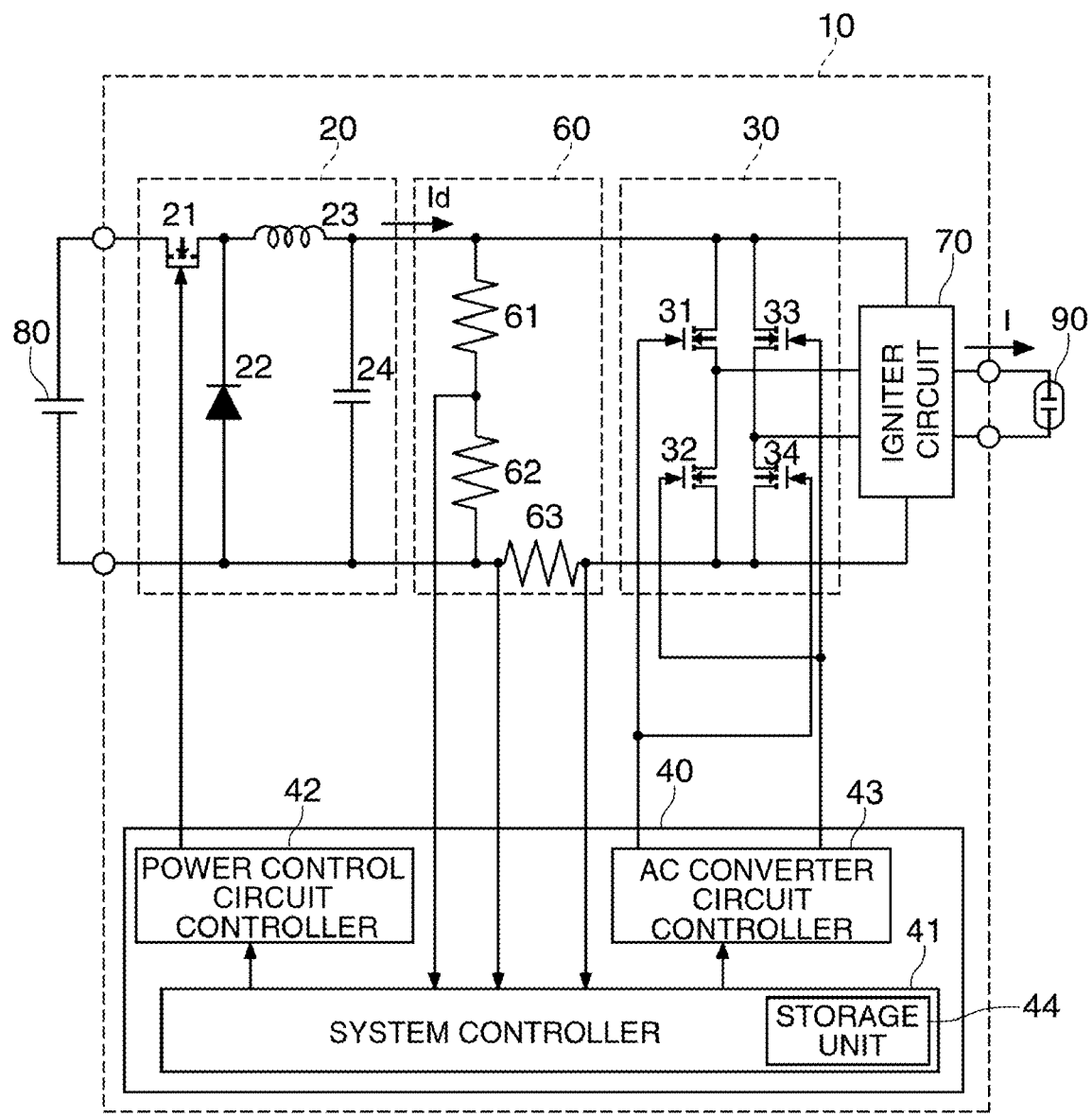
FIG. 3 is a view for explaining an exemplary circuit configuration of a discharge lamp lighting device according to an embodiment of the invention.

2. Discharge Lamp Lighting Device According to First Embodiment (1) Exemplary Circuit Configuration of Discharge Lamp Lighting Device FIG. 3 shows an exemplary circuit diagram of the discharge lamp lighting device according to this embodiment.

The discharge lamp lighting device 10 includes a power control circuit 20. The power control circuit 20 controls driving power supplied to the discharge lamp 90. In this embodiment, the power control circuit 20 is formed by a down chopper circuit that takes a DC power source 80 as its input, then lowers the input voltage and outputs a DC current Id.

The power control circuit 20 may include a switch element 21, a diode 22, a coil 23 and a capacitor 24. The switch element 21 may be formed, for example, by a transistor. In this embodiment, one end of the switch element 21 is connected to the positive voltage side of the DC power source 80 and the other end is connected to the cathode terminal of the diode 22 and one end of the coil 23. Moreover, one end of the capacitor 24 is connected to the other end of the coil 23 and the other end of the capacitor 24 is connected to the anode terminal of the diode 22 and the negative voltage side of the DC power source 80. To the control terminal of the switch element 21, a current control signal is inputted from a control unit 40, thus controlling on/off state of the switch element 21. As the current control signal, for example, a PWM control signal may be used.

Now, when the switch element 21 is turned on, a current flows through the coil 23 and energy is accumulated in the coil 23. After that, when the switch element 21 is turned off, the energy accumulated in the coil 23 is released via the capacitor 24 and the diode 22. As a result, a DC current Id is generated which corresponds to the proportion of time when the switch element 21 is on.

The discharge lamp lighting device 10 includes an AC converter circuit 30. The Ac converter circuit 30 takes, as its input, the DC current Id outputted from the power control circuit 20, then inverts polarity in predetermined timing, and thus generates and outputs a driving current for discharge lamp driving having an arbitrary frequency and duty ratio. The duty ratio is the proportion of time of first polarity in one cycle of an AC current I for discharge lamp driving which is inverted between first polarity and second polarity. In this embodiment, the Ac converter circuit 30 is formed by an inverter bridge circuit (full-bridge circuit).

The AC converter circuit 30 includes, for example, first to fourth switch elements 31 to 34 such as transistors. The first and second switch elements 31 and 32, which are connected in series, and the third and fourth switch elements 33 and 34, which are connected in series, are connected in parallel. A frequency control signal from the control unit 40 is inputted to each of the control terminals of the first to fourth switch elements 31 to 34, thus controlling on/off state of the first to fourth switch elements 31 to 34.

In the AC converter circuit 30, alternate turning on and off of the first and fourth switch elements 31 and 34 and the second and third switch elements 32 and 33 is repeated. Thus, the polarity of the DC current Id outputted from the power control circuit 20 is alternately inverted. An AC current I for discharge lamp driving having a controlled frequency and duty ratio is generated and outputted from the common connection point of the first and second switch elements 31 and 32 and the common connection point of the third and fourth switch elements 33 and 34.

That is, these switch elements are controlled in such a manner that when the first and fourth switch elements 31 and 34 are on, the second and third switch elements 32 and 33 are off, whereas when the first and fourth switch elements 31 and 34 are off, the second and third switch elements 32 and 33 are on. Therefore, when the first and fourth switch elements 31 and 34 are on, an AC current I for discharge lamp driving is generated which flows from the one end of the capacitor 24 to the first switch element 31, the discharge lamp 90 and the fourth switch element 34 in this order. When the second and third switch elements 32 and 33 are on, an AC current I for discharge lamp driving is generated which flows from the one end of the capacitor 24 to the third switch element 33, the discharge lamp 90 and the second switch element 32 in this order.

The discharge lamp lighting device 10 includes the control unit 40. The control unit 40 controls the power control circuit 20 and the AC converter circuit 30, thereby controlling the current value, frequency, duty ratio and waveform of the AC current I for discharge lamp driving. The control unit 40 carries out AC conversion control processing to the AC converter circuit 30 to control the frequency and duty ratio by using the polarity inversion timing of the AC current I for discharge lamp driving, and also carries out sectional current control processing to the power control circuit 20 to control the current value of the outputted DC current Id for each polarity inversion timing section. Here, the polarity inversion section is the time between polarity inversion timings that are next to each other in time. That is, one cycle of the AC current I for discharge lamp driving includes two polarity inversion timing sections.

The control unit 40 may also determine whether flicker is generated in the discharge lamp 90 or not, and a flicker generating electrode in accordance with the output of an operation detecting unit, which will be described later.

The configuration of the control unit 40 is not particularly limited. However, in this embodiment, the control unit 40 includes a system controller 41, a power control circuit controller 42 and an AC converter circuit controller 43. A part of the control unit 40 or its entirety may be formed by a semiconductor integrated circuit.

The system controller 41 controls the power control circuit controller 42 and the AC converter circuit controller 43 and thereby controls the power control circuit 20 and the AC converter circuit 30. The system controller 41 may control the power control circuit controller 42 and the AC converter circuit controller 43 in accordance with a discharge lamp driving voltage and the AC current I for discharge lamp driving detected by an operation detecting unit 60 provided within the discharge lamp lighting device 10, which will be described later.

In this embodiment, the system controller 41 includes a storage unit 44. The storage unit 44 may also be provided separately from the system controller 41.

The system controller 41 may control the power control circuit 20 and the AC converter circuit 30 in accordance with information stored in the storage unit 44. In the storage unit 44, for example, information about the current value, frequency, duty ratio and waveform of the AC current I for discharge lamp driving may be stored.

The power control circuit controller 42 outputs a current control signal to the power control circuit 20 in accordance with a control signal from the system controller 41, thereby controlling the power control circuit 20.

The AC converter circuit controller 43 outputs an inversion control signal to the AC converter circuit 30 in accordance with a control signal from the system controller 41, thereby controlling the AC converter circuit 30.

The discharge lamp lighting device 10 may include an operation detecting unit 60. The operation detecting unit 60 may detect the operation of the discharge lamp 90, for example, the discharge lamp driving voltage of the discharge lamp or the AC current I for discharge lamp driving, and output driving voltage information or driving current information. In this embodiment, the operation detecting unit 60 includes first to third resistors 61 to 63.

The operation detecting unit 60 detects the discharge lamp driving voltage by using a voltage divided by the first and second resistors 61 and 62, which are connected parallel to the discharge lamp 90 and connected in series with each other. The operation detecting unit 60 detects the AC current I for discharge lamp driving by using a voltage generated at the third resistor 63, which is connected in series with the discharge lamp 90.

The discharge lamp lighting device 10 may include an igniter circuit 70. The igniter circuit 70 operates only when lighting of the discharge lamp 90 starts. When lighting of the discharge lamp 90 starts, the igniter circuit 70 supplies, between the electrodes of the discharge lamp 90, a high voltage (a higher voltage than in normal control operation) that is necessary to cause dielectric breakdown between the electrodes of the discharge lamp 90 and thus form a discharge path. In this embodiment, the igniter circuit 70 is connected parallel to the discharge lamp 90.

Figure 4A:
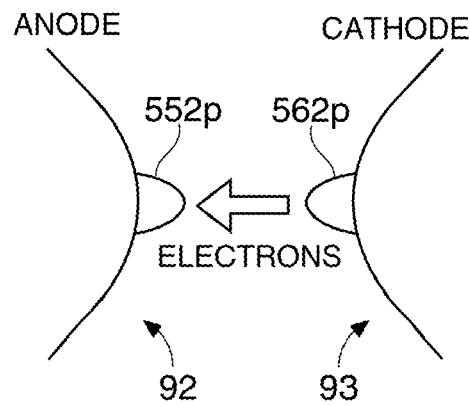
FIG. 4A to FIG. 4D are views for explaining an exemplary circuit configuration of a discharge lamp lighting device according to an embodiment of the invention.
Figure 4B:
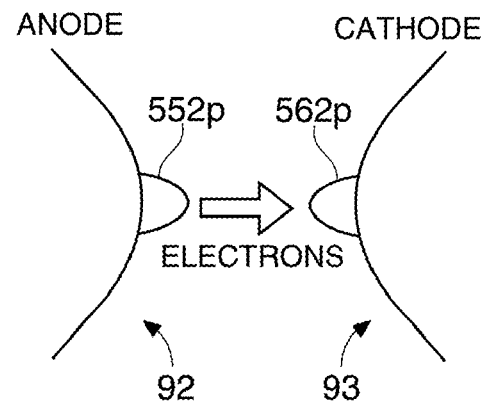

FIG. 4A to FIG. 4D are explanatory views showing the relation between the polarity of driving power supplied to the discharge lamp 90 and the temperature of the electrodes. FIG. 4A and FIG. 4B show the operation state of the two electrodes 92 and 93. In FIG. 4A and FIG. 4B, the distal ends of the two electrodes 92 and 93 are shown. Protrusions 552p and 562p are provided at the distal ends of the electrodes 92 and 93, respectively. Discharge occurs between these protrusions 552p and 562p. In this example, shift of the discharge position (arc position) in each of the electrodes 92 and 93 can be restrained, compared with the case with no protrusions. However, such protrusions may be omitted.

FIG. 4A shows a first polarity state P1 in which the first electrode 92 operates as the anode and the second electrode 93 operates as the cathode. In the first polarity state P1, discharge causes electrons to move from the second electrode 93 (cathode) to the first electrode 92 (anode) Electrons are released from the cathode (second electrode 93). The electrons released from the cathode (second electrode 93) collide with the distal end of the anode (first electrode 92). This collision generates heat and the temperature of the distal end (protrusion 552p) of the anode (first electrode 92) rises.

FIG. 4B shows a second polarity state P2 in which the first electrode 92 operates as the cathode and the second electrode 93 operates as the anode. In the second polarity state P2, as opposed to the first polarity state P1, electrons move from the first electrode 92 to the second electrode 93. Consequently, the temperature of the distal end (protrusion 562p) of the second electrode 93 rises.

In this manner, the temperature of the anode tends to be higher than that of the cathode. The continued state where the temperature of one electrode is higher than that of the other electrode can cause various troubles. For example, if the distal end of the electrode with the higher temperature is excessively melted, unintended deformation of the electrode can occur. Consequently, the arc length may deviate from its proper value. Meanwhile, if the distal end of the electrode with the lower temperature is melted insufficiently, small recesses and protrusions generated at the distal end can remain without being melted. Consequently, a so-called arc jump may occur (the arc position is unstable and shifts).

Figure 4C:
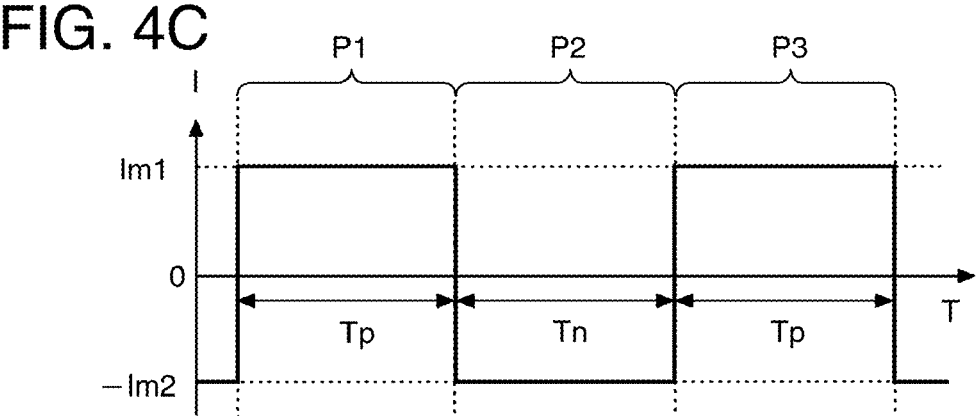

As a technique of restraining such troubles, AC driving to repeat switching the polarity of each electrode can be used. FIG. 4C is a timing chart showing AC power (driving signal) supplied to the discharge lamp 90 (FIG. 2). The horizontal axis represents time T. The vertical axis represents current I. The current I is a current flowing through the discharge lamp 90. A positive value represents the first polarity state P1. A negative value represents the second polarity state P2. In the example shown in FIG. 4C, a rectangular AC current is used. The first polarity state P1 and the second polarity state P2 are alternately repeated. Here, a first polarity section Tp represents a time period during which the first polarity state P1 continues. A second polarity section Tn represents a time period during which the second polarity state P2 continues. The average current value in the first polarity section Tp is +A0. The average current value in the second polarity section Tn is −A0. The driving frequency can be experimentally decided in accordance with the characteristics of the discharge lamp 90 (for example, a value in the range of 30 Hz to 1 kHz is employed). Similarly, the other values +A0, −A0, Tp and Tn can be decided experimentally.

Figure 4D:
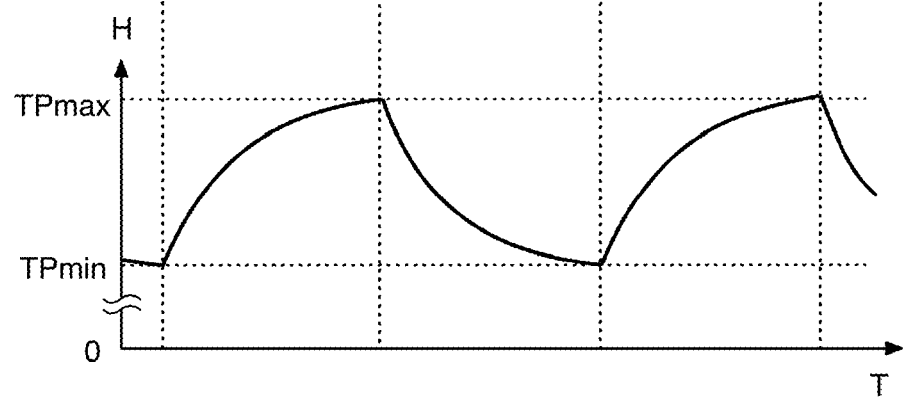

FIG. 4D is a timing chart showing temperature change in the first electrode 92. The horizontal axis represents time T. The vertical axis represents temperature H. The temperature H of the first electrode 92 rises in the first polarity state P1. The temperature H of the first electrode 92 falls in the second polarity state P2. Since the first polarity state P1 and the second polarity state P2 are repeated, the temperature H changes cyclically between a minimum value Hmin and a maximum value Hmax. Although not shown, the temperature of the second electrode 93 changes in the reverse phase of the temperature H of the first electrode 92. That is, the temperature of the second electrode 93 falls in the first polarity state P1. The temperature of the second electrode 93 rises in the second polarity state P2.

In the first polarity state P1, the distal end of the first electrode 92 (protrusion 552*p*) melts and therefore the distal end of the first electrode 92 (protrusion 552*p*) becomes smooth. Thus, shift of the discharge position in the first electrode 92 can be restrained. Meanwhile, the temperature of the distal end of the second electrode 93 (protrusion 562*p*) falls and therefore excessive melting of the second electrode 93 (protrusion 562*p*) is restrained. Thus, unintended deformation of the electrode can be restrained. In the second polarity state P2, the conditions of the first electrode 92 and the second electrode 93 are reversed. Thus, as the two states P1 and P2 are repeated, troubles in the two electrodes 92 and 93 can be restrained.

Now, if the waveform of the current I is symmetrical, that is, if the waveform of the current I satisfies the condition of "|+A0|=|−A0| and Tp=Tn", the two electrodes 92 and 93 have the same condition of power supplied thereto. Therefore, the difference in temperature between the two electrodes 92 and 93 is estimated to be small. However, if driving with such a symmetrical current waveform is maintained, a steady convection current is generated in the discharge space 91, and the electrode material may be deposited or causes to segregate locally at the axial part of the electrodes and may grow in a needle-shape. This may cause unintended discharge toward the wall surface of the light-transmissive material surrounding the discharge space 91. Such unintended discharge degrades this inner wall and may cause reduction in the life of the discharge lamp 90. Moreover, if driving with such a symmetrical current waveform is maintained, a constant temperature distribution of the electrodes is continued for a long time. Therefore, asymmetry of the electrodes generated by state change with time tends to be further promoted with time.

(2) Exemplary Control of Discharge Lamp Lighting Device

Next, a specific example of controlling the discharge lamp lighting device 10 according to this embodiment will be described.

The control unit 40 of the discharge lamp lighting device 10 according to this embodiment carries out repair control to change, in a cyclical pattern, cumulative energy supplied to each electrode of the discharge lamp in one cycle of the AC current for discharge lamp driving in predetermined timing. This cyclical pattern includes plural sectional periods in which the cumulative energy supplied to each electrode of the discharge lamp is maintained at the same value over plural cycles of the AC current I for discharge lamp driving, and in this pattern, the cumulative energy supplied to each electrode of the discharge lamp differs between at least two of the sectional periods.

The cumulative energy is equivalent to the electric energy supplied from the discharge lamp lighting device during the period when each electrode is the anode. The predetermined timing may be, for example, periodical timing or timing when occurrence of flicker is detected.

With this control, since repair control is carried out in the predetermined timing, heat load on the electrodes of the discharge lamp can be reduced, compared to the control to constantly change, in a cyclical pattern, the cumulative energy supplied to each electrode of the discharge lamp in one cycle of the AC current for discharge lamp driving.

Moreover, when repair control is carried out, the cumulative energy supplied to each electrode of the discharge lamp 90 in one cycle is changed in the cyclical pattern including plural sectional periods in which the cumulative energy supplied to each electrode of the discharge lamp 90 in one cycle is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period.

That is, the thermal state of the two electrodes and their peripheries can be largely varied on a relatively long time scale. Thus, the electrode temperature can be properly changed and uneven wear of the electrodes and uneven precipitation of the electrode material can be prevented. Moreover, by repair control, unwanted protrusions on the electrodes can be melted. Thus, occurrence of flicker can be restrained.

The cumulative energy supplied to each electrode in one cycle of the AC current I for discharge lamp driving may be controlled in accordance with the duty ratio of the AC current I for discharge lamp driving or in accordance with the current value of the AC current I for discharge lamp driving.

The case of controlling the cumulative energy supplied to each electrode in accordance with the duty ratio of the AC current I for discharge lamp driving will now be described with reference to FIG. 1 to FIG. 11.

In this case, the control unit 40 carries out repair control to perform AC conversion control processing to change the duty ratio of the AC current I for discharge lamp driving in a cyclical pattern. This cyclical pattern includes plural sectional periods in which the duty ratio of the AC current I for discharge lamp driving is maintained at the same value over plural cycles of the AC current I for discharge lamp driving. In this pattern, the duty ratio of the AC current I for discharge lamp driving differs between at least two of the sectional periods.

Here, the case where the first electrode of the discharge lamp 90 is an anode represents the first polarity of the AC current I for discharge lamp driving, and the duty ratio is referred to as the proportion of time of the first polarity in one cycle of the AC current for discharge lamp driving which is inverted between the first polarity and the second polarity.

Figure 5:
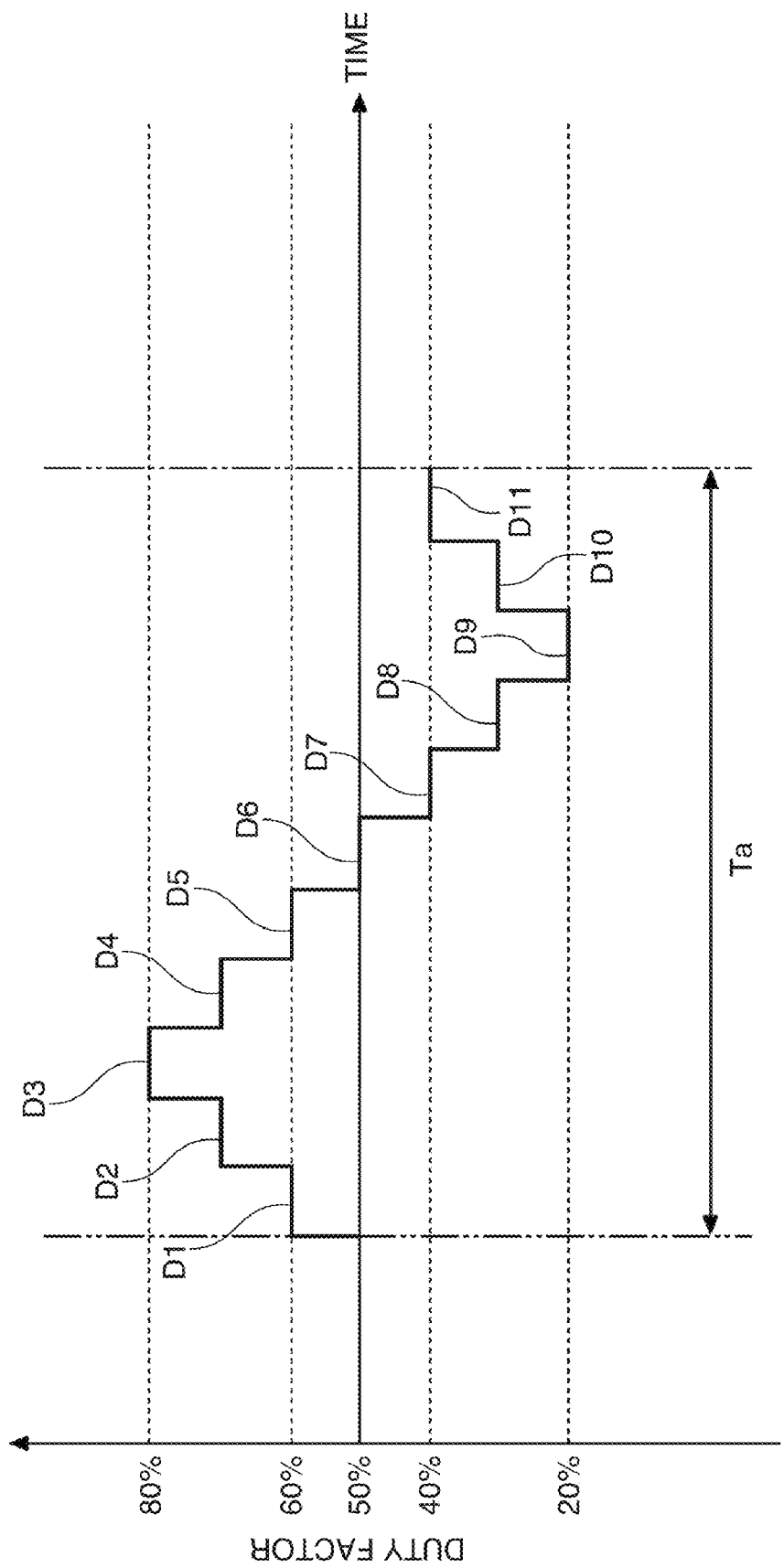
FIG. 5 is a view for explaining an exemplary control of a discharge lamp lighting device according to an embodiment of the invention.

FIG. 5 shows an exemplary cyclical pattern to change the duty ratio of the AC current I for discharge lamp driving. The horizontal axis represents time. The vertical axis represents duty ratio.

In the example shown in FIG. 5, the control unit 40 carries out repair control to perform AC conversion control processing to change the duty ratio stepwise in the period of one cycle Ta of a cyclical pattern including 11 sectional periods (sectional periods D1 to D11) in which the duty ratio of the AC current I for discharge lamp driving is maintained at the same value. That is, a sectional period is a period during which the same AC conversion control processing continues, as viewed in terms of one cycle of the AC current I for discharge lamp driving. In this embodiment, the length per sectional period of the sectional periods D1 to D11 is four seconds.

In this embodiment, repair control is carried out in periodical timing (for example, every 360 seconds).

In the example shown in FIG. 5, the duty ratio of the AC current I for discharge lamp driving is fixed at 50% in other times than repair control. When repair control is started, the duty ratio is 60% in the sectional period D1, is then raised by 10% each, and reaches the maximum level of 80% in the sectional period D3. After that, the duty ratio is lowered by 10% each and reaches the minimum level of 20% in the sectional period D9. After that, the duty ratio is raised by 10% each, and increase and decrease of the duty ratio is repeated with the cycle Ta.

If the discharge lamp 90 has conditions that cause the temperature of one of the two electrodes 92 and 93 to become higher than that of the other during operation, the duty ratio may be set in such a manner that the temperature of the other electrode tends to rise more than the one electrode in other times than repair control. For example, in the case of the discharge lamp 90 in which the second edge 90e2 side of the discharge space 91 is surrounded by the sub reflection mirror 50 as in the light source unit 110 shown in FIG. 2, there is less heat radiation from the second edge 90e2 side of the discharge space 91 and therefore the temperature of the second electrode 93 tends to be higher than that of the first electrode 92. In such case, the duty ratio of the AC current I for discharge lamp driving may be fixed at 60% in other time than repair control.

In the example shown in FIG. 5, repair control is carried out in which only the cyclical pattern equivalent to one cycle Ta to change the duty ratio of the AC current I for discharge lamp driving is included. However, repair control including plural cycles of the cyclical pattern may also be carried out.

Figure 6A:
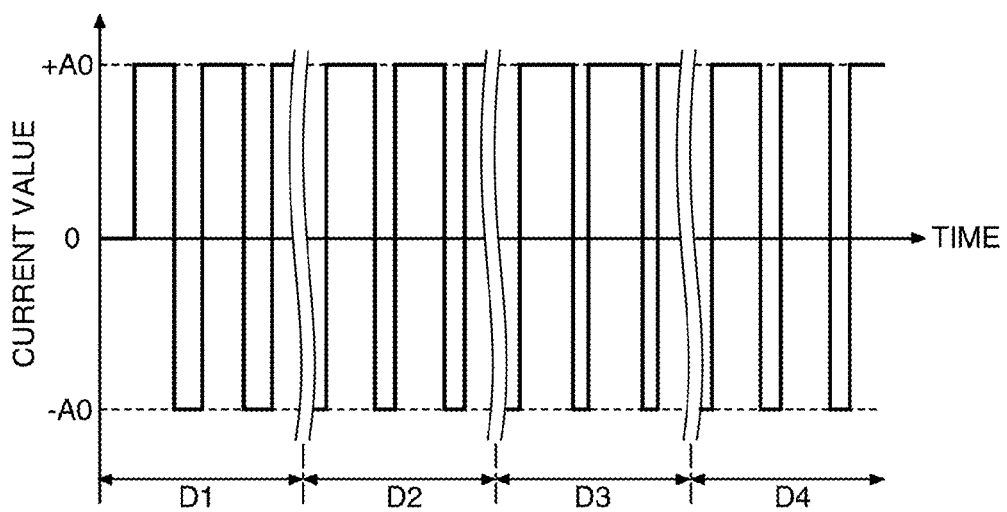
FIG. 6A to FIG. 6C are views for explaining an exemplary control of a discharge lamp lighting device according to an embodiment of the invention.
Figure 6B:
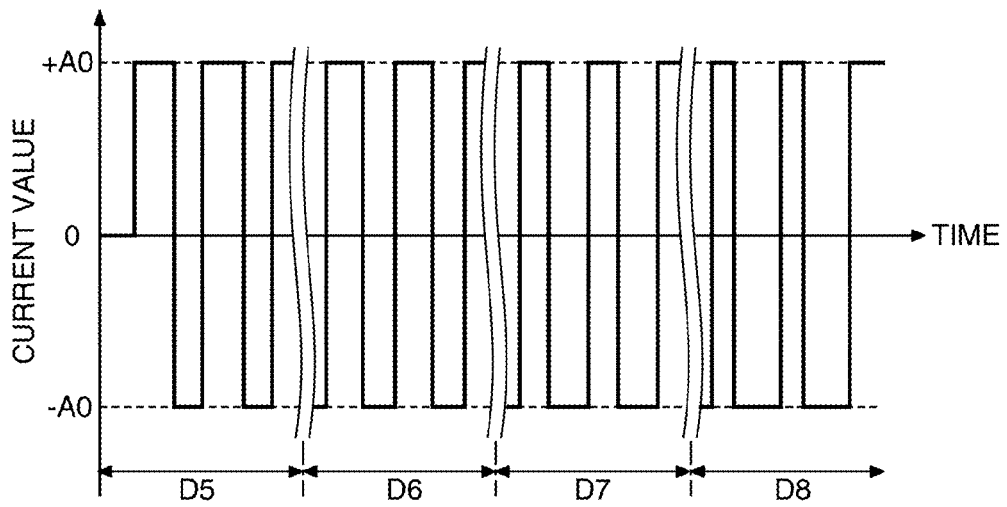
Figure 6C:
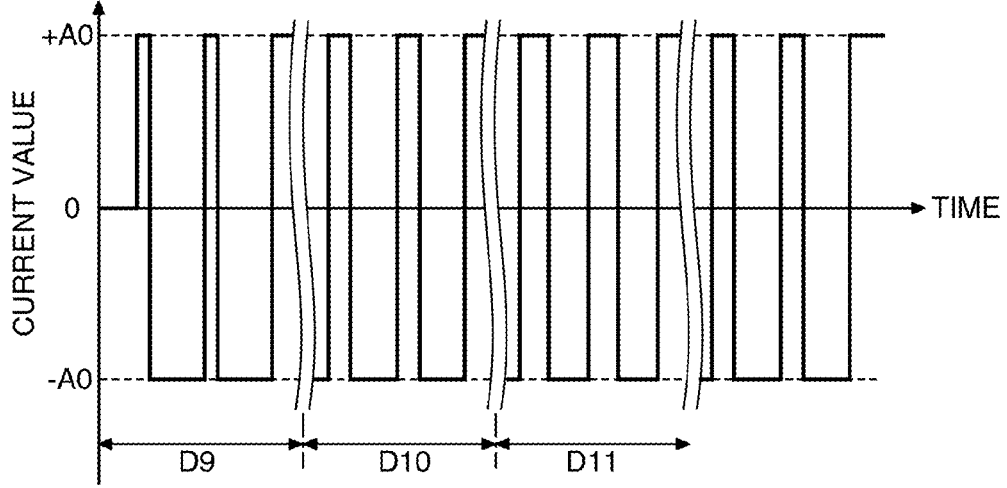

FIG. 6A to FIG. 6C show waveform transition of the AC current I for discharge lamp driving in the case where the duty ratio is changed in the cyclical pattern shown in FIG. 5 in repair control. The horizontal axis represents time. The vertical axis represents current value. In this embodiment, current control processing is carried out to achieve an average current value of +A0 at the time of the first polarity and an average current value of −A0 at the time of the second polarity.

FIG. 6A shows waveform transition of the AC current I from the sectional period D1 to the sectional period D4 shown in FIG. 5. In the sectional period D1, a current waveform with a duty ratio of 60% continues. When the sectional period D2 starts, this changes to a current waveform with a duty ratio of 70%, which continues during the sectional period D2. When the sectional period D3 starts, this changes to a current waveform with a duty ratio of 80%, which continues during the sectional period D3. When the sectional period D4 starts, this changes to a current waveform with a duty ratio of 70%, which continues during the sectional period D4.

FIG. 6B shows waveform transition of the AC current I from the sectional period D5 to the sectional period D8 shown in FIG. 5. In the sectional period D5, a current waveform with a duty ratio of 60% continues. When the sectional period D6 starts, this changes to a current waveform with a duty ratio of 50%, which continues during the sectional period D6. When the sectional period D7 starts, this changes to a current waveform with a duty ratio of 40%, which continues during the sectional period D7. When the sectional period D8 starts, this changes to a current waveform with a duty ratio of 30%, which continues during the sectional period D8.

FIG. 6C shows waveform transition of the AC current I from the sectional period D9 to the sectional period D11 shown in FIG. 5. In the sectional period D9, a current waveform with a duty ratio of 20% continues. When the sectional period D10 starts, this changes to a current waveform with a duty ratio of 30%, which continues during the sectional period D10. When the sectional period D11 starts, this changes to a current waveform with a duty ratio of 40%, which continues during the sectional period D11.

With this control, since repair control is carried out in the predetermined timing, heat load on the electrodes of the discharge lamp can be reduced, compared to the control to constantly change the duty ratio of the AC current for discharge lamp driving in a cyclical pattern.

Moreover, when repair control is carried out, the duty ratio of the AC current I for discharge lamp driving is changed in the cyclical pattern including plural sectional periods in which the duty ratio of the AC current I for discharge lamp driving is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period.

That is, the thermal state of the two electrodes and their peripheries can be largely varied on a relatively long time scale. Thus, the electrode temperature can be properly changed and uneven wear of the electrodes and uneven precipitation of the electrode material can be prevented. Moreover, by repair control, unwanted protrusions on the electrodes can be melted. Thus, occurrence of flicker can be restrained.

First Modification

In the above embodiment, the control unit 40 carries out control with the fixed duty ratio of the AC current I for discharge lamp driving, in other times than repair control. However, the control unit 40 may carry out stationary control to control the duty ratio of the AC current I for discharge lamp driving in a different cyclical pattern from the above pattern, in other times than repair control. In such case, at the time of repair control, the control unit 40 may carry out control with a cyclical pattern in which the difference between the maximum value and the minimum value of the duty ratio of the AC current I for discharge lamp driving is greater than the difference between these values at the time of stationary control.

Figure 7:
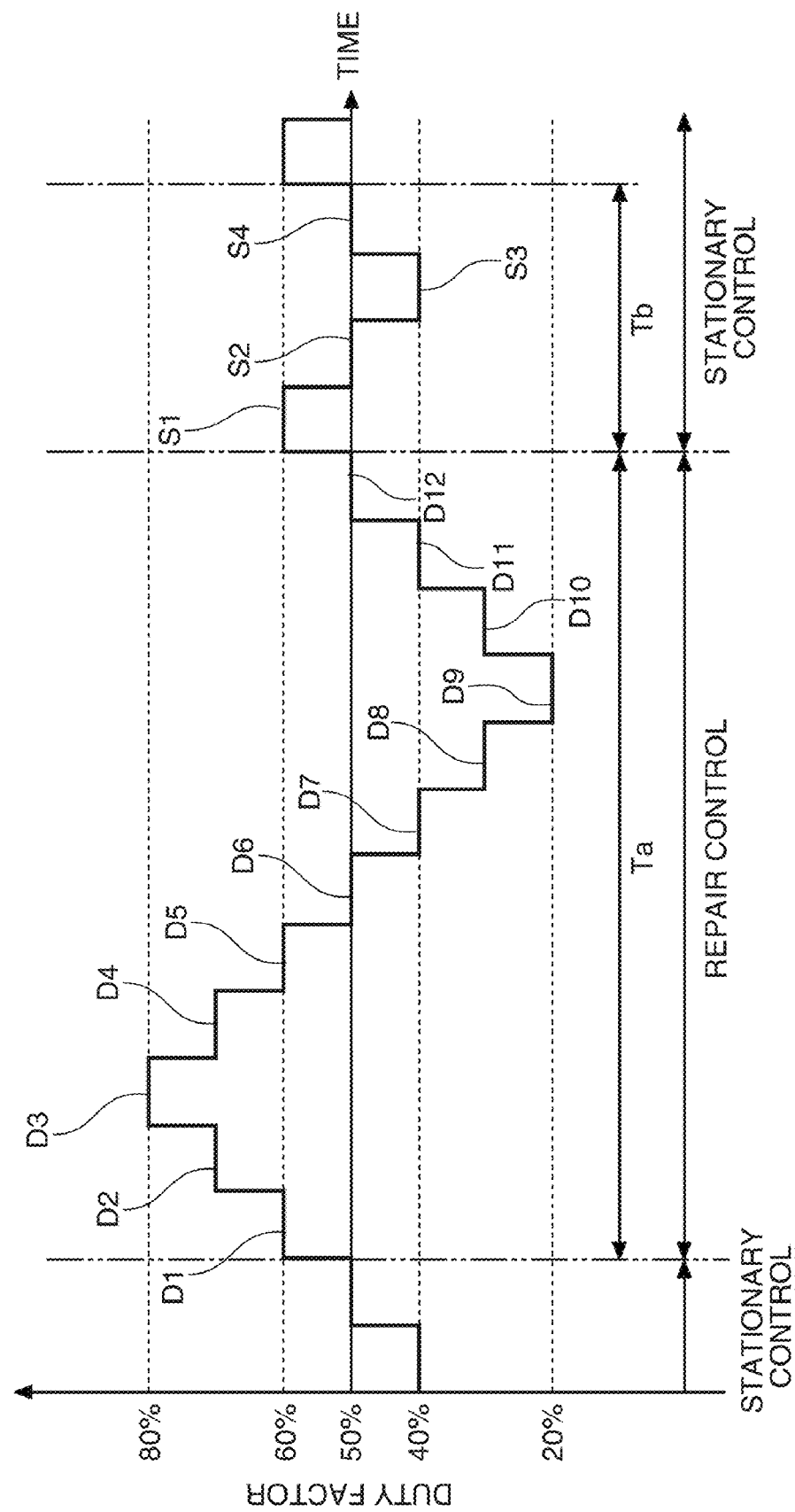
FIG. 7 is a view for explaining an exemplary control of a discharge lamp lighting device according to an embodiment of the invention.

FIG. 7 shows an example of one cycle Ta of the cyclical pattern at the time of repair control to change the duty ratio of the AC current I for discharge lamp driving and one cycle Tb of the cyclical pattern at the time of stationary control. The horizontal axis represents time. The vertical axis represents duty ratio.

In the example shown in FIG. 7, the control unit 40 carries out repair control to perform AC conversion control processing to change the duty ratio stepwise in the cyclical pattern of one cycle Ta including 12 sectional periods (sectional periods D1 to D12) in the period of one cycle Ta in which the duty ratio of the AC current I for discharge lamp driving is maintained at the same value. In this embodiment, the length per sectional period of the sectional periods D1 to D12 is four seconds.

In other times than repair control, the control unit 40 carries out stationary control to perform AC conversion control processing to change the duty ratio stepwise in the cyclical pattern of one cycle Tb including four sectional periods (sectional periods S1 to S4) in the period of one cycle Tb in which the duty ratio of the AC current I for discharge lamp driving is maintained at the same value. In this embodiment, the length per sectional period of the sectional periods S1 to S4 is four seconds.

At the time of repair control, the duty ratio is 60% in the sectional period D1. After that, the duty ratio is raised by 10% each and reaches the maximum level of 80% in the sectional period D3. After that, the duty ratio is lowered by 10% each and reaches the minimum level of 20% in the sectional period D9. After that, the duty ratio is raised by 10% each and increase and decrease of the duty ratio is repeated with the cycle Ta.

At the time of stationary control, the duty ratio is at its maximum of 60% in the sectional period S1. After that, the duty ratio is lowered by 10% each and reaches the maximum level of 40% in the sectional period S3. After that, the duty ratio is raised by 10% each and increase and decrease of the duty ratio is repeated with the cycle Tb.

With such control, heat load on the electrodes of the discharge lamp can be reduced at the time of stationary control, compared to the time of repair control.

Also in stationary control, the duty ratio of the AC current I for discharge lamp driving is changed in the cyclical pattern including plural sectional periods in which the duty ratio of the AC current I for discharge lamp driving is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period. Therefore, also in stationary driving, the thermal state of the two electrodes and their peripheries can be largely varied on a relatively long time scale. Thus, the electrode temperature can be properly changed and uneven wear of the electrodes and uneven precipitation of the electrode material can be prevented.

Moreover, by repair control, unwanted protrusions on the electrodes that cannot be melted at the time of stationary control can be melted. Thus, occurrence of flicker can be restrained.

Second Modification

In the above embodiment, the control unit 40 carries out repair control in periodical timing. However, the control unit 40 including a flicker detecting unit that detects flicker in accordance with a discharge lamp driving voltage may carry out repair control based on flicker detection timing of the flicker detecting unit.

Moreover, for example, the control unit 40 may determine a flicker generating electrode in accordance with flicker detection timing of the flicker detecting unit and carry out repair control to change the duty ratio in a cyclical pattern to extend the time when the flicker generating electrode is the anode.

The flicker detecting unit may be realized by a combination of the control unit 40 and the operation detecting unit 60. In this case, for example, in accordance with driving voltage information of the discharge lamp 90 outputted from the operation detecting unit 60, it can be determined that flicker is generated in the discharge lamp 90 if the driving voltage of the discharge lamp 90 falls out of a predetermined range.

The control unit 40 may also determine that an electrode serving as the cathode in flicker detection timing is a flicker generating electrode.

Figure 8A:
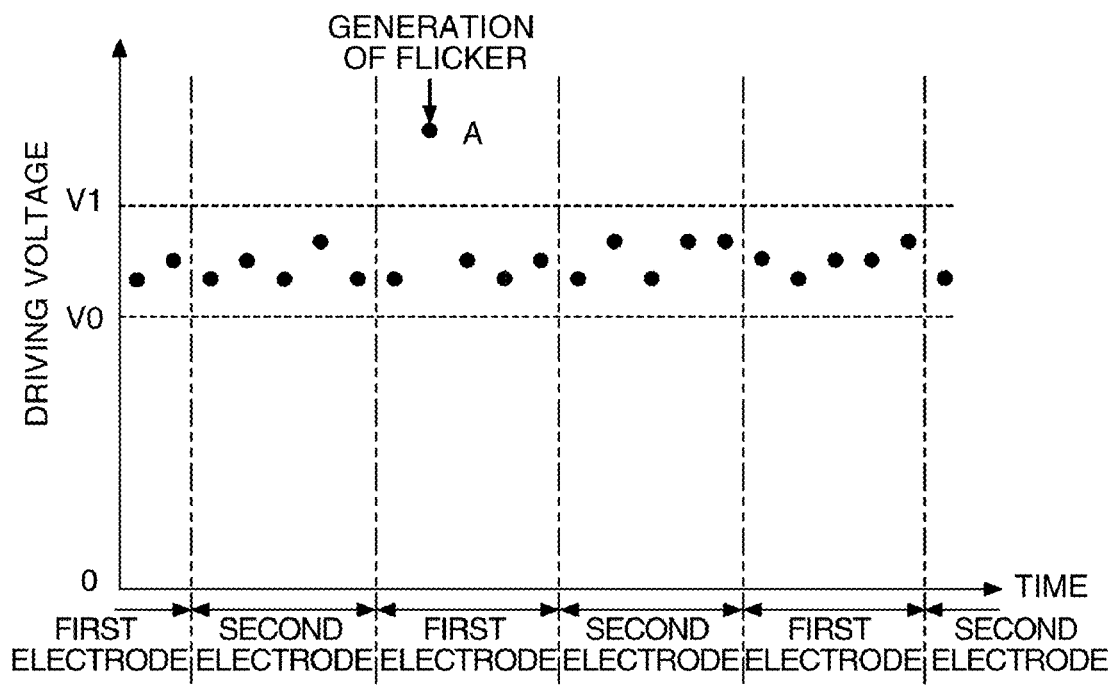
FIG. 8A and FIG. 8B are views for explaining an exemplary control of a discharge lamp lighting device according to an embodiment of the invention.
Figure 8B:
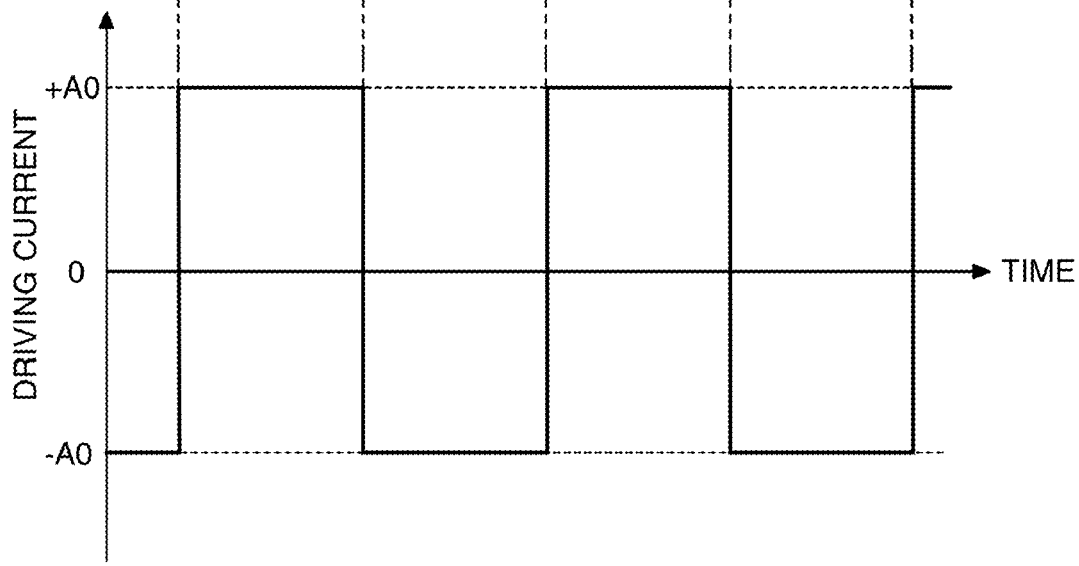

FIG. 8A and FIG. 8B are views for explaining an exemplary method for determining the generation of flicker and an exemplary method for determining a flicker generating electrode. FIG. 8A is a graph showing an exemplary result of digitally sampling the driving voltage of the discharge lamp 90. The horizontal axis represents time. The vertical axis represents the driving voltage of the discharge lamp 90. The driving voltage of the discharge lamp 90 in the state where no flicker is generated is assumed to fall within the range from V0 to V1 (predetermined range).

FIG. 8B is a graph showing the driving current of the discharge lamp 90 corresponding to FIG. 8A. The horizontal axis represents time. The vertical axis represents the driving current of the discharge lamp 90. The driving current of the discharge lamp 90 in the case where the first electrode of the discharge lamp 90 is the anode while the second electrode is the cathode is +A0. The driving current of the discharge lamp 90 in the case where the second electrode of the discharge lamp 90 is the anode while the first electrode is the cathode is −A0.

In FIG. 8A, the driving voltage of the discharge lamp 90 at a measuring point A falls out of the range from V0 to V1. Therefore, the control unit 40 determines that flicker is generated in the discharge lamp 90 in the timing of the measuring point A.

In the timing of the measuring point A, with respect to the driving current of the discharge lamp 90 in FIG. 8B, the second electrode of the discharge lamp 90 is the anode and the first electrode is the cathode. Therefore, the control unit 40 determines that the flicker generating electrode is the first electrode.

Figure 9:
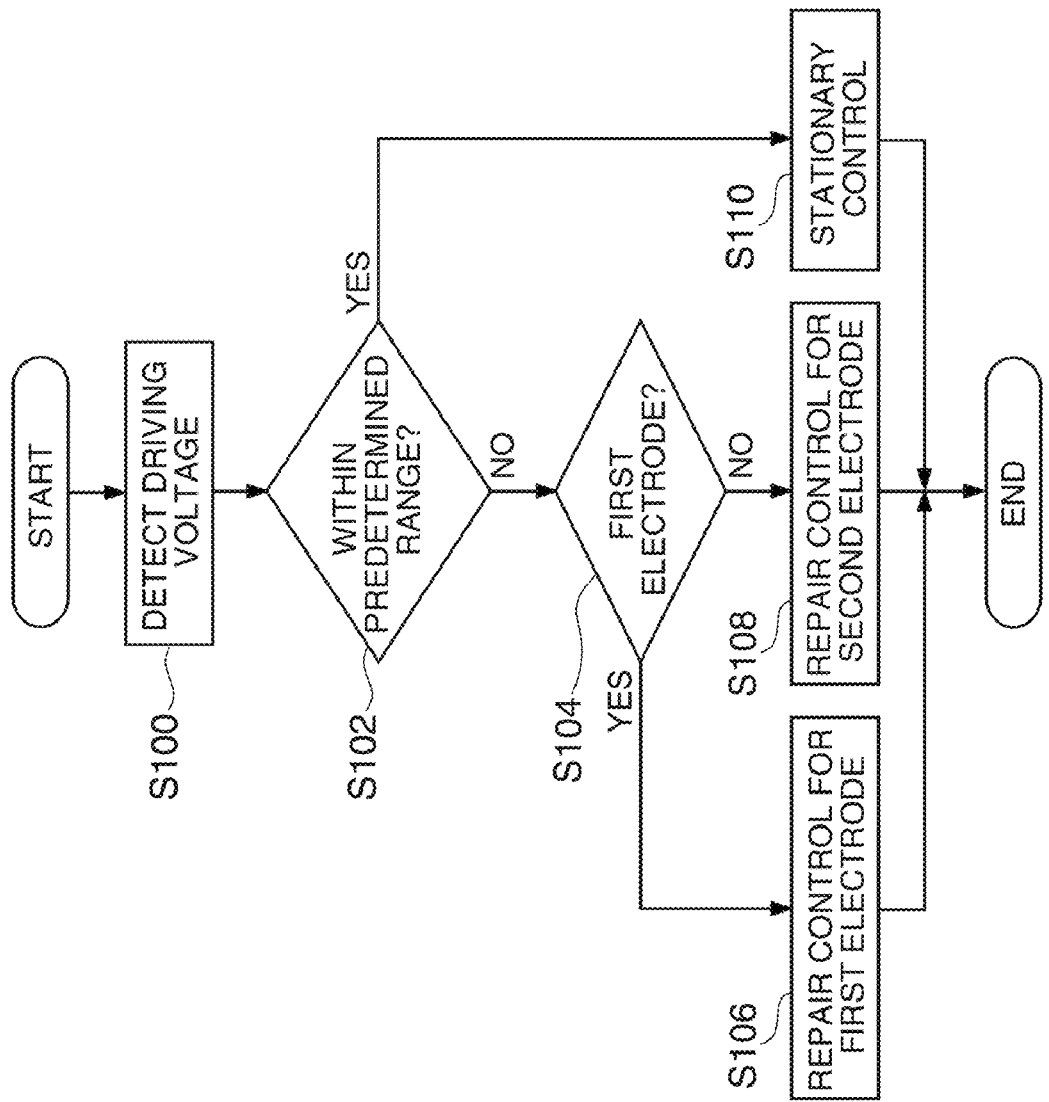
FIG. 9 is a view for explaining an exemplary control of a discharge lamp lighting device according to an embodiment of the invention.

FIG. 9 is an exemplary flowchart showing a control flow in this modification.

First, the operation detecting unit 60 detects the driving voltage of the discharge lamp 90 and the control unit 40 acquires driving voltage information of the discharge lamp 90 outputted from the operation detecting unit 60 (step S100). Next, the control unit 40 determines whether the driving voltage of the discharge lamp 90 is within a predetermined range or not (step S102). If the driving voltage of the discharge lamp 90 is within the predetermined range, the control unit 40 carries out stationary control (step S110).

If the driving voltage of the discharge lamp 90 is not within the predetermined range, the control unit 40 determines that flicker is generated, and the control unit 40 determines whether the flicker generating electrode is the first electrode or not (step S104). If the flicker generating electrode is the first electrode, the control unit 104 carries out repair control for the first electrode (step S106). If the flicker generating electrode is not the first electrode, the control unit 40 carries out repair control for the second electrode (S108).

Such a control flow may be sequentially repeated or repeated every predetermined period.

In this modification, the flicker generating electrode is determined and repair control for the first electrode and repair control for the second electrode are separately carried out. However, it is also possible to carry out the same repair control when flicker is generated, without determining the flicker generating electrode.

Figure 10:
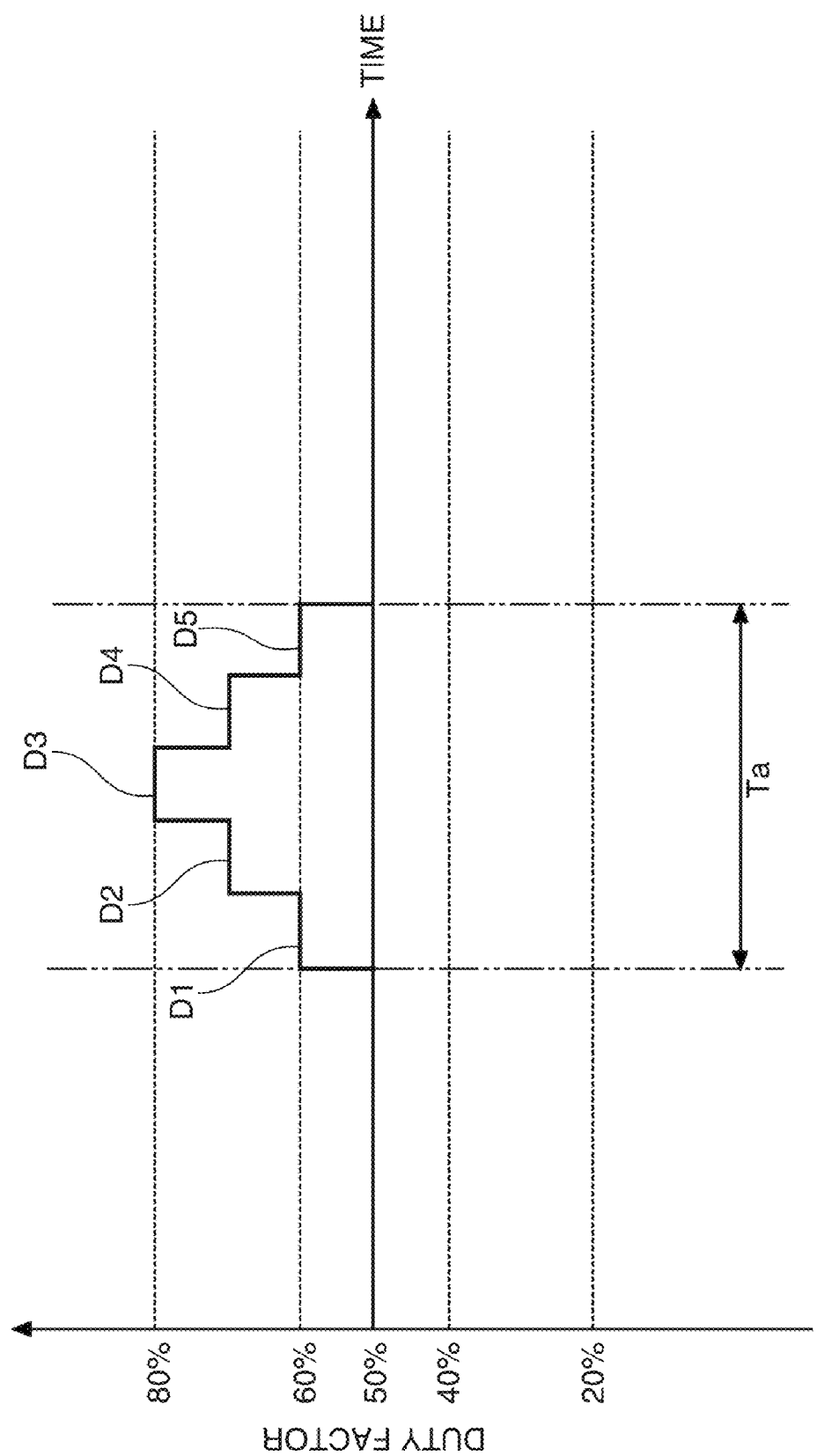
FIG. 10 is a view for explaining an exemplary control of a discharge lamp lighting device according to an embodiment of the invention.

FIG. 10 shows an exemplary cyclical pattern to change the duty ratio of the AC current I for discharge lamp driving in the case where flicker is generated at the first electrode of the discharge lamp 90 (that is, in the case of repair control for the first electrode). The horizontal axis represents time. The vertical axis represents duty ratio. In sectional periods D1 to D5, the control unit 40 carries out AC conversion control processing to control the duty ratio in a cyclical pattern to extend the time when the first electrode as the flicker generating electrode is the anode (repair control for the first electrode).

As the duty ratio is thus controlled in a cyclical pattern to extend the time when the first electrode as the flicker generating electrode is the anode, heat load on the electrode where no flicker is generated, that is, heat load on the electrode that is not worn, can be reduced. Moreover, unwanted protrusions on the flicker generating electrode can be melted by repair control. Thus, occurrence of flicker can be restrained.

If flicker is generated at the second electrode of the discharge lamp 90 (that is, in the case of repair control for the second electrode), the control unit 40 carries out AC conversion control processing to control the duty ratio in a cyclical pattern to extend the time when the second electrode as the flicker generating electrode is the anode (repair control for the second electrode).

In addition to this modification, the control unit 40 can also combine stationary control to control the duty ratio of the AC current I for discharge lamp driving in a cyclical pattern in other times than repair control.

With such control, in addition to the reduction in heat load on the electrode where no flicker is generated, that is, heat load on the electrode that is not worn, heat load on the electrodes of the discharge lamp can be reduced at the time of stationary control, compared to the time of repair control.

Also in stationary control, the duty ratio of the AC current I for discharge lamp driving is changed in the cyclical pattern including plural sectional periods in which the duty ratio of the AC current I for discharge lamp driving is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period. Therefore, also in stationary driving, the thermal state of the two electrodes and their peripheries can be largely varied on a relatively long time scale. Thus, the electrode temperature can be properly changed and uneven wear of the electrodes and uneven precipitation of the electrode material can be prevented.

Moreover, by repair control to change the duty ratio in a cyclical pattern to extend the time when the flicker generating electrode is the anode, the cumulative energy supplied when the flicker generating electrode is the anode can be increased to melt unwanted protrusions on the electrode that cannot be melted at the time of stationary control. Thus, occurrence of flicker can be prevented.

Third Modification

In the first modification, the control unit 40 carries out repair control in the cyclical pattern including sectional periods with the same time length per sectional period as in stationary control. However, in the third modification, the control unit 40 may carry out repair control in a cyclical pattern including a sectional period having a shorter time length per sectional period than in stationary control.

Figure 11:
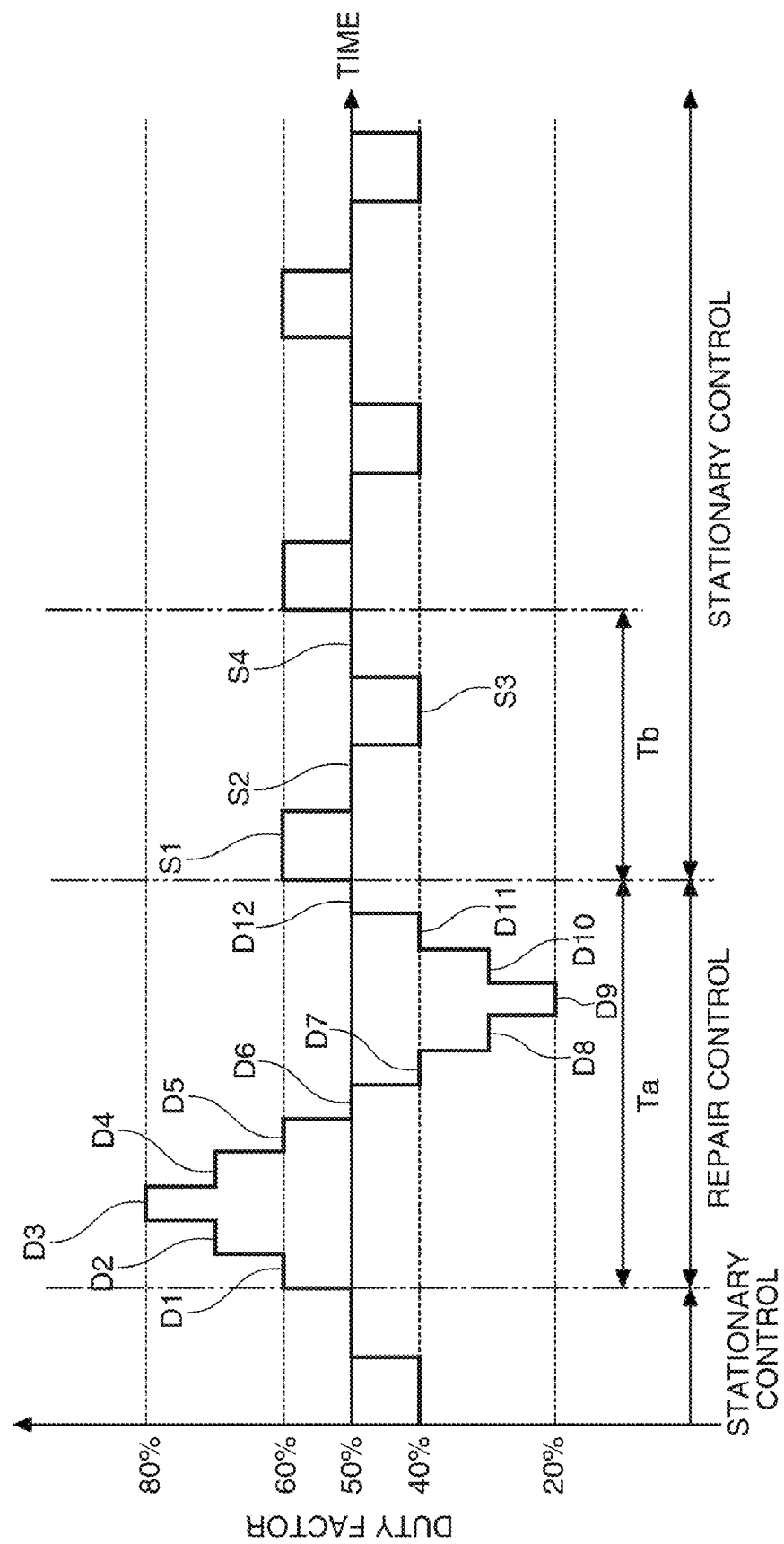
FIG. 11 is a view for explaining an exemplary control of a discharge lamp lighting device according to an embodiment of the invention.

FIG. 11 shows an example of one cycle Ta of a cyclical pattern in repair control and one cycle Tb of a cyclical pattern in stationary control to change the duty ratio of the AC current I for discharge lamp driving. The horizontal axis represents time. The vertical axis represents duty ratio.

The control at the time of stationary control is similar to the example described with reference to FIG. 7. However, the control at the time of repair control is different in that the length per sectional period of the sectional periods D1 to D12 is two seconds, which is shorter than the length per sectional period of the sectional periods S1 to S4, that is, four seconds.

In this manner, the time per sectional period in repair control is made shorter than the time per sectional period in stationary control, and the low-temperature period of the electrode that becomes the anode for a shorter period in repair control (in the example of FIG. 11, the second electrode in the sectional period D3 and the first electrode in the sectional period D9) can be reduced according to the cyclical pattern. Thus, occurrence of flicker can be restrained.

In stationary control, control is carried out in a cyclical pattern in which the difference between the maximum value and the minimum value of the duty ratio is smaller than in repair control. Therefore, heat load on the electrodes of the discharge lamp can be reduced.

The timing when the control unit 40 carries out repair control may be periodical timing. Alternatively, the control unit 40 may carry out repair control based on flicker detection timing of the flicker detecting unit, as in the second modification.

With such a control, in addition to the reduction in heat load on the electrode where no flicker is generated, that is, heat load on the electrode that is not worn, heat load on the electrodes of the discharge lamp can be reduced at the time of stationary control, compared to the time of repair control.

Also in stationary control, the duty ratio of the AC current I for discharge lamp driving is changed in the cyclical pattern including plural sectional periods in which the duty ratio of the AC current I for discharge lamp driving is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period. Therefore, also in stationary driving, the thermal state of the two electrodes and their peripheries can be largely varied on a relatively long time scale. Thus, the electrode temperature can be properly changed and uneven wear of the electrodes and uneven precipitation of the electrode material can be prevented.

Moreover, by repair control, unwanted protrusions on the electrodes that cannot be melted at the time of stationary control can be melted more efficiently. Thus, occurrence of flicker can be prevented.

Other Modifications

For example, in the above description of the embodiment, the current value is constant within the polarity inversion timing section. However, the control unit 40 may carry out sectional current control processing in which the current value of the DC current Id in the polarity inversion timing section is at maximum in the latter half of the polarity inversion timing section.

The control unit 40 may also carry out sectional current control processing in which the current value of the DC current Id is monotonically increased within the polarity inversion timing section.

With combinations of such controls, unwanted protrusions on the electrodes can be melted more efficiently in repair control. Thus, occurrence of flicker can be restrained more effectively.

3. Discharge Lamp Lighting Device According to Second Embodiment

The case of controlling the cumulative energy supplied to each electrode in one cycle of the AC current I for discharge lamp driving by using the current value of the AC current I for discharge lamp driving will now be described with reference to FIG. 1 to FIGS. 4A-4D and FIG. 12 to FIG. 17. The elements of configuration similar to those of the first embodiment are denoted by the same reference numerals and will not be described further in detail.

In this case, the control unit 40 carries out repair control to perform sectional current control processing to change, in a cyclical pattern, the difference in absolute value between the current value of the AC current I for discharge lamp driving in the first polarity section and the current value in the second polarity section. This cyclical pattern includes plural sectional periods in which the difference in absolute value between the current value in the first polarity section and the current value in the second polarity section is maintained at the same value over plural cycles of the AC current I for discharge lamp driving. In this pattern, the difference in absolute value between the current value in the first polarity section and the current value in the second polarity section differs between at least two of the sectional periods.

Figure 12:
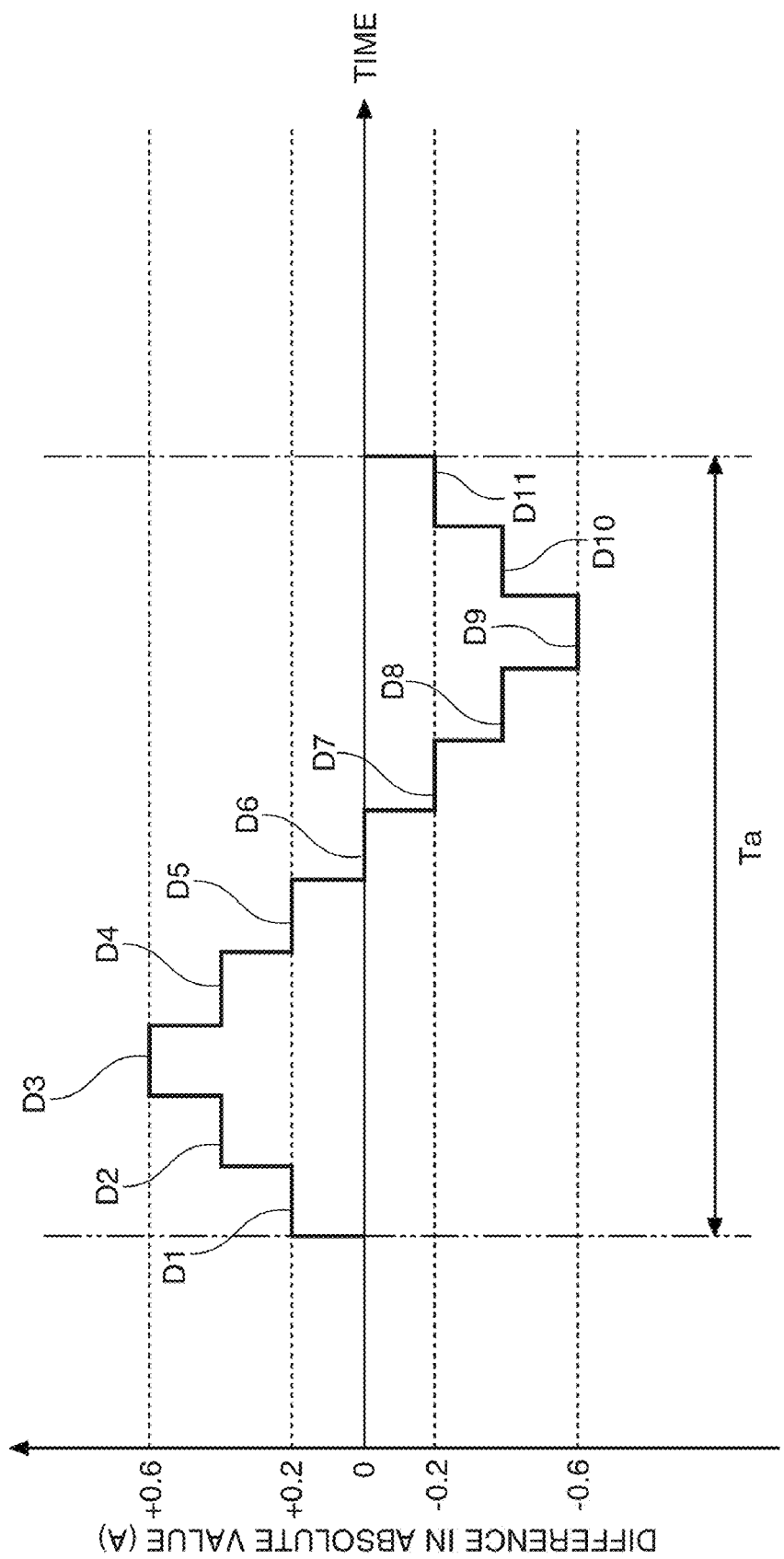
FIG. 12 is a view for explaining an exemplary control of a discharge lamp lighting device according to an embodiment of the invention.

FIG. 12 shows an exemplary cyclical pattern to change the difference in absolute value between the current value of the AC current I for discharge lamp driving in the first polarity section and the current value in the second polarity section. The horizontal axis represents time. The vertical axis represents the difference in absolute value between the current value of the AC current I for discharge lamp driving in the first polarity section and the current value in the second polarity section.

In the example shown in FIG. 12, the control unit 40 carries out repair control to perform AC conversion control processing to change the difference in absolute value between the current value of the AC current I for discharge lamp driving in the first polarity section and the current value in the second polarity section, stepwise in a cyclical pattern of one cycle Ta including 11 sectional periods (sectional periods D1 to D11) during the period of one cycle Ta in which the difference in absolute value between the current value of the AC current I for discharge lamp driving in the first polarity section and the current value in the second polarity section is maintained at the same value. That is, a sectional period is a period during which the same sectional current control processing continues, as viewed in terms of one cycle of the AC current I for discharge lamp driving. In this embodiment, the length per sectional period of the sectional periods D1 to D11 is four seconds.

In this embodiment, repair control is carried out in periodical timing (for example, every 360 seconds).

In the example shown in FIG. 12, the difference in absolute value between the current value of the AC current I for discharge lamp driving in the first polarity section and the current value in the second polarity section is fixed at 0 A in other times than repair control. When repair control is started, the difference in absolute value between the current value of the AC current I for discharge lamp driving in the first polarity section and the current value in the second polarity section is set at 0.2 A in the sectional period D1 and is then increased by 0.2 A each. The difference in absolute value between the current value of the AC current I for discharge lamp driving in the first polarity section and the current value in the second polarity section reaches the maximum level of 0.6 A in the sectional period D3.

If the discharge lamp 90 has conditions that cause the temperature of one of the two electrodes 92 and 93 to become higher than that of the other during operation, the difference in absolute value between the current value of the AC current I for discharge lamp driving in the first polarity section and the current value in the second polarity section may be set in such a manner that the temperature of the other electrode tends to rise more than the one electrode in other times than repair control. For example, in the case of the discharge lamp 90 in which the second edge 90e2 side of the discharge space 91 is surrounded by the sub reflection mirror 50 as in the light source unit 110 shown in FIG. 2, there is less heat radiation from the second edge 90e2 side of the discharge space 91 and therefore the temperature of the second electrode 93 tends to be higher than that of the first electrode 92. In such case, the difference in absolute value between the current value of the AC current I for discharge lamp driving in the first polarity section and the current value in the second polarity section may be fixed at 0.2 A in other time than repair control.

After that, the difference in absolute value between the current value of the AC current I for discharge lamp driving in the first polarity section and the current value in the second polarity section is reduced by 0.2 A each. The difference in absolute value between the current value of the AC current I for discharge lamp driving in the first polarity section and the current value in the second polarity section reaches the minimum level of −0.6 A in the sectional period D9.

After that, the difference in absolute value between the current value of the AC current I for discharge lamp driving in the first polarity section and the current value in the second polarity section is increased by 0.2 A each. Then, increase and decrease of the difference in absolute value between the current value of the AC current I for discharge lamp driving in the first polarity section and the current value in the second polarity section is repeated with the cycle Ta.

In the example shown in FIG. 12, repair control is carried out in which only the cyclical pattern equivalent to one cycle Ta to change the difference in absolute value between the current value of the AC current I for discharge lamp driving in the first polarity section and the current value in the second polarity section is included. However, repair control including plural cycles of the cyclical pattern may also be carried out.

Next, a specific example of sectional current control processing in the discharge lamp lighting device 10 according to this embodiment will be described.

Figure 13A:
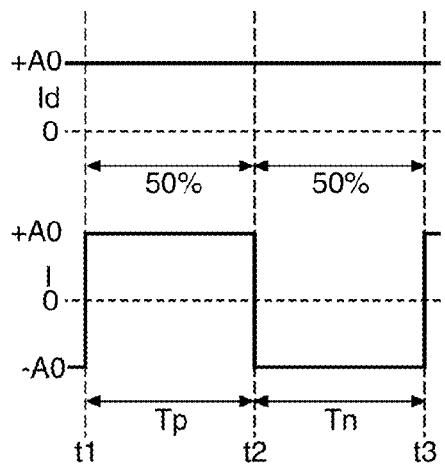
FIG. 13A to FIG. 13E are views for explaining an exemplary control of a discharge lamp lighting device according to an embodiment of the invention.
Figure 13D:
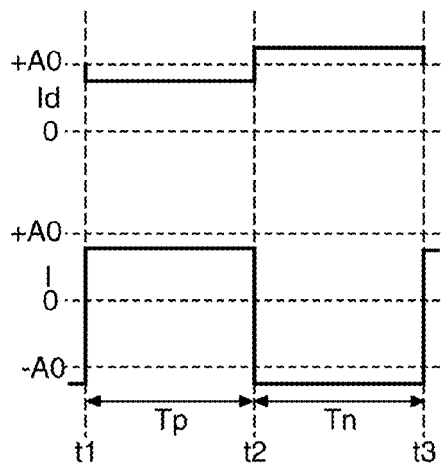

FIG. 13A shows the waveform of the DC current Id outputted from the power control circuit 20 and the AC current I for discharge lamp driving when the difference in absolute value between the current value of the AC current I for discharge lamp driving in the first polarity section Tp and the current value in the second polarity section Tn is 0 A. The horizontal axis represents time. The vertical axis represents current value. Times t1, t2 and t3 represent the polarity inversion timing of the AC current I for discharge lamp driving. As polarity inversion timing sections, the first polarity section in which the AC current I for discharge lamp driving has the first polarity (the first electrode of the two electrodes is the anode) is the section Tp and the second polarity section in which the AC current I for discharge lamp driving has the second polarity (the first electrode of the two electrodes is the cathode) is the section Tn. The combination of the section Tp and the section Tn forms one cycle of the AC current I. That is, the polarity inversion timing sections include the first polarity section (section Tp) and the second polarity section (section Tn). Here, the duty ratio of the AC current I for discharge lamp driving is the proportion of the first polarity section Tp in one cycle of the AC current I. In the examples shown in FIG. 13A to FIG. 13E, the duty ratio is assumed to be 50%.

In the example shown in FIG. 13A, sectional current control processing to cause the DC current Id outputted from the power control circuit 20 to have the same current value (+A0) in each of the section Tp and the section Tn is carried out. Consequently, the AC current I for discharge lamp driving has a current value (+A0) in the section Tp and a current value (−A0) in the section Tn. That is, the difference in absolute value between the current value of the AC current I for discharge lamp driving in the first polarity section and the current value in the second polarity section is 0 A.

Figure 13B:
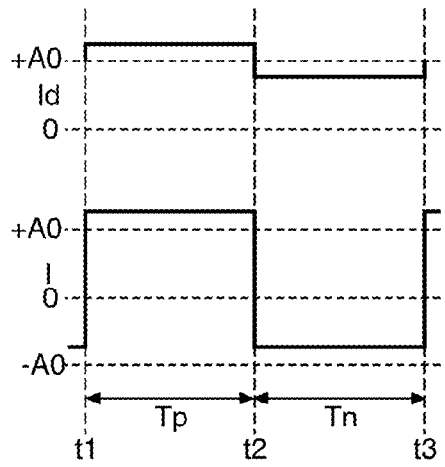
Figure 13E:
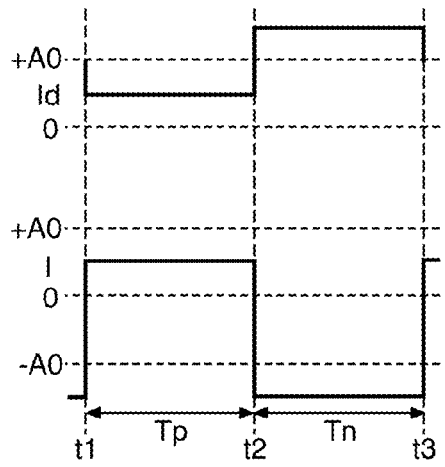

In the example shown in FIG. 13B, sectional current control processing to cause the DC current Id outputted from the power control circuit 20 to have a current value +A0+0.1 A in the section Tp and to cause the DC current Id outputted from the power control circuit 20 to have a current value +A0−0.1 A in the section Tn is carried out. Consequently, the AC current I for discharge lamp driving has a current value A) in the section Tp and a current value (−A0−0.1 A) in the section Tn. The difference in absolute value between the current value of the AC current I for discharge lamp driving in the first polarity section and the current value in the second polarity section is +0.2 A.

Figure 13C:
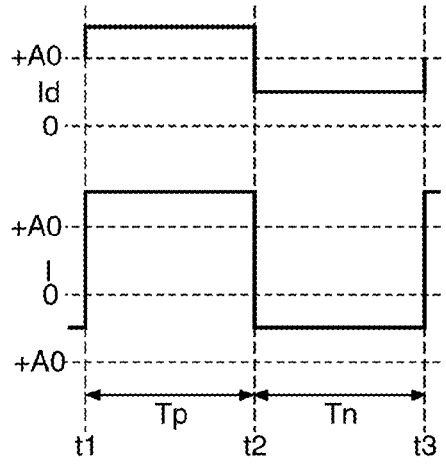

Similarly, in the example shown in FIG. 13C, the difference in absolute value between the current value of the AC current I for discharge lamp driving in the first polarity section and the current value in the second polarity section is +0.4 A. In the example shown in FIG. 13D, the difference in absolute value between the current value of the AC current I for discharge lamp driving in the first polarity section and the current value in the second polarity section is −0.2 A. In the example shown in FIG. 13E, the difference in absolute value between the current value of the AC current I for discharge lamp driving in the first polarity section and the current value in the second polarity section is −0.4 A.

Figure 14A:
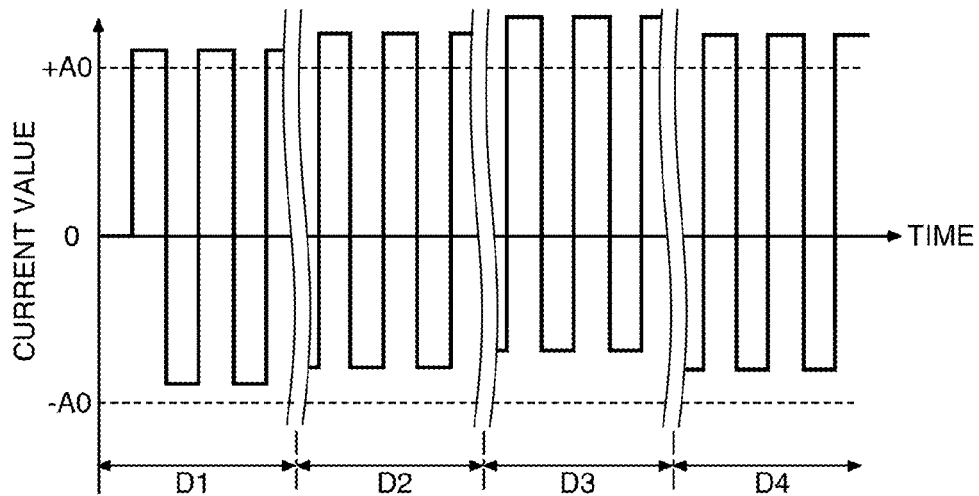
FIG. 14A to FIG. 14C are views for explaining an exemplary control of a discharge lamp lighting device according to an embodiment of the invention.
Figure 14B:
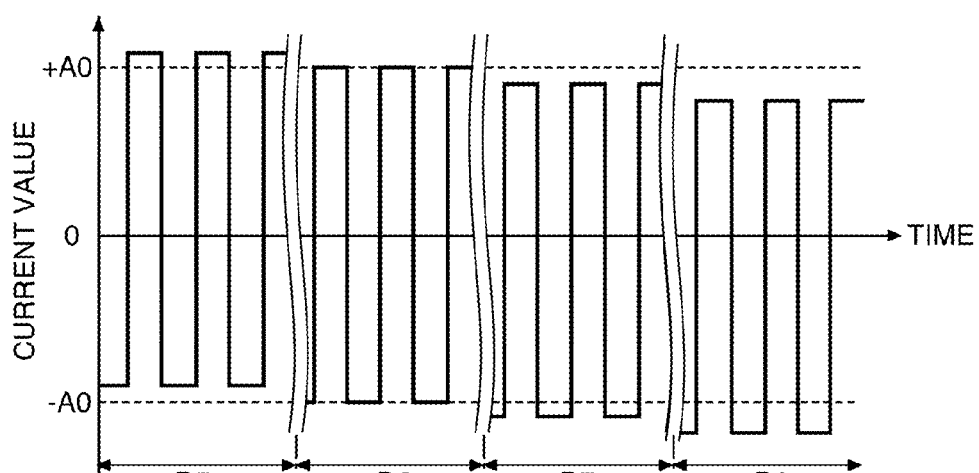
Figure 14C:
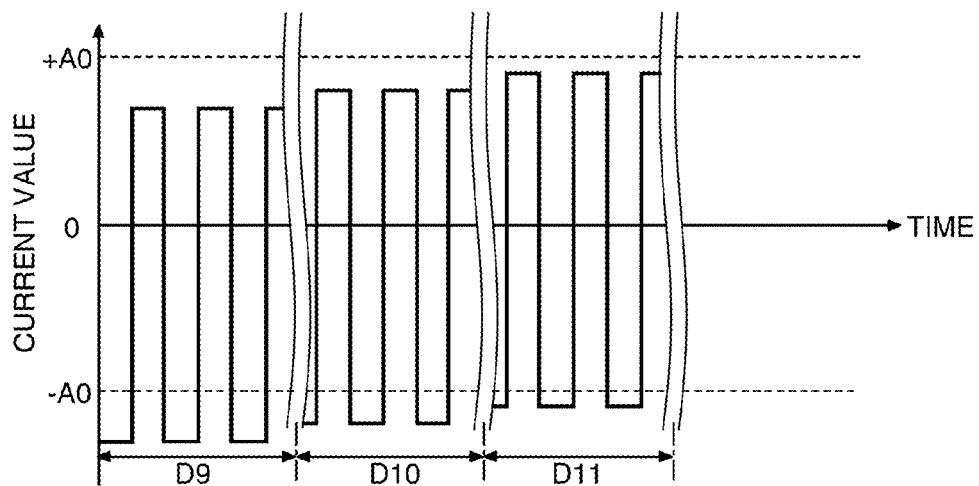

FIG. 14A and FIG. 14C shows waveform transition of the AC current I for discharge lamp driving in the case where the difference in absolute value between the current value of the AC current I for discharge lamp driving in the first polarity section and the current value in the second polarity section is changed in the cyclical pattern shown in FIG. 12 at the time of repair control. The horizontal axis represents time. The vertical axis represents current value.

FIG. 14A shows waveform transition of the AC current I from the sectional period D1 to the sectional period D4 in FIG. 12. In the sectional period D1, a current waveform continues in which the difference in absolute value between the current value of the AC current I for discharge lamp driving in the first polarity section and the current value in the second polarity section is +0.2 A. When the sectional period D2 starts, the waveform changes to a current waveform in which the difference in absolute value between the current value of the AC current I for discharge lamp driving in the first polarity section and the current value in the second polarity section is +0.4 A. This waveform continues during the sectional period D2. When the sectional period D3 starts, the waveform changes to a current waveform in which the difference in absolute value between the current value of the AC current for discharge lamp driving in the first polarity section and the current value in the second polarity section is +0.6 A. This waveform continues during the sectional period D3. When the sectional period D4 starts, the waveform changes to a current waveform in which the difference in absolute value between the current value of the AC current I for discharge lamp driving in the first polarity section and the current value in the second polarity section is +0.4 A. This waveform continues during the sectional period D4.

FIG. 14B shows waveform transition of the AC current I from the sectional period D5 to the sectional period D8 in FIG. 12. In the sectional period D5, a current waveform continues in which the difference in absolute value between the current value of the AC current I for discharge lamp driving in the first polarity section and the current value in the second polarity section is +0.2 A. When the sectional period D6 starts, the waveform changes to a current waveform in which the difference in absolute value between the current value of the AC current I for discharge lamp driving in the first polarity section and the current value in the second polarity section is 0 A. This waveform continues during the sectional period D6. When the sectional period D7 starts, the waveform changes to a current waveform in which the difference in absolute value between the current value of the AC current for discharge lamp driving in the first polarity section and the current value in the second polarity section is −0.2 A. This waveform continues during the sectional period D7. When the sectional period D8 starts, the waveform changes to a current waveform in which the difference in absolute value between the current value of the AC current I for discharge lamp driving in the first polarity section and the current value in the second polarity section is −0.4 A. This waveform continues during the sectional period D8.

FIG. 14C shows waveform transition of the AC current I from the sectional period D9 to the sectional period D11 in FIG. 12. In the sectional period D9, a current waveform continues in which the difference in absolute value between the current value of the AC current I for discharge lamp driving in the first polarity section and the current value in the second polarity section is −0.6 A. When the sectional period D10 starts, the waveform changes to a current waveform in which the difference in absolute value between the current value of the AC current I for discharge lamp driving in the first polarity section and the current value in the second polarity section is −0.4 A. This waveform continues during the sectional period D10. When the sectional period D11 starts, the waveform changes to a current waveform in which the difference in absolute value between the current value of the AC current for discharge lamp driving in the first polarity section and the current value in the second polarity section is −0.2 A. This waveform continues during the sectional period D11.

With this control, since repair control is carried out in predetermined timing, heat load on the electrodes of the discharge lamp can be reduced, compared to the case of control to constantly change the difference in absolute value between the current value of the AC current I for discharge lamp driving in the first polarity section and the current value in the second polarity section, in a cyclical pattern.

Moreover, when repair control is carried out, the difference in absolute value between the current value of the AC current I for discharge lamp driving in the first polarity section and the current value in the second polarity section is changed in the cyclical pattern including plural sectional periods in which the difference in absolute value between the current value of the AC current I for discharge lamp driving in the first polarity section and the current value in the second polarity section is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period.

That is, the thermal state of the two electrodes and their peripheries can be largely varied on a relatively long time scale. Thus, the electrode temperature can be properly changed and uneven wear of the electrodes and uneven precipitation of the electrode material can be prevented. Moreover, by repair control, unwanted protrusions on the electrodes can be melted. Thus, occurrence of flicker can be restrained.

First Modification

In the above embodiment, the control unit 40 carries out control with the fixed difference in absolute value between the current value of the AC current I for discharge lamp driving in the first polarity section and the current value in the second polarity section, in other times than repair control. However, the control unit 40 may carry out stationary control to control the difference in absolute value between the current value of the AC current I for discharge lamp driving in the first polarity section and the current value in the second polarity section in a different cyclical pattern from the above pattern, in other times than repair control. In such case, at the time of repair control, the control unit 40 may carry out control with a cyclical pattern in which the difference between the maximum value and the minimum value of the difference in absolute value between the current value of the AC current I for discharge lamp driving in the first polarity section and the current value in the second polarity section is greater than the difference between these values at the time of stationary control.

Figure 15:
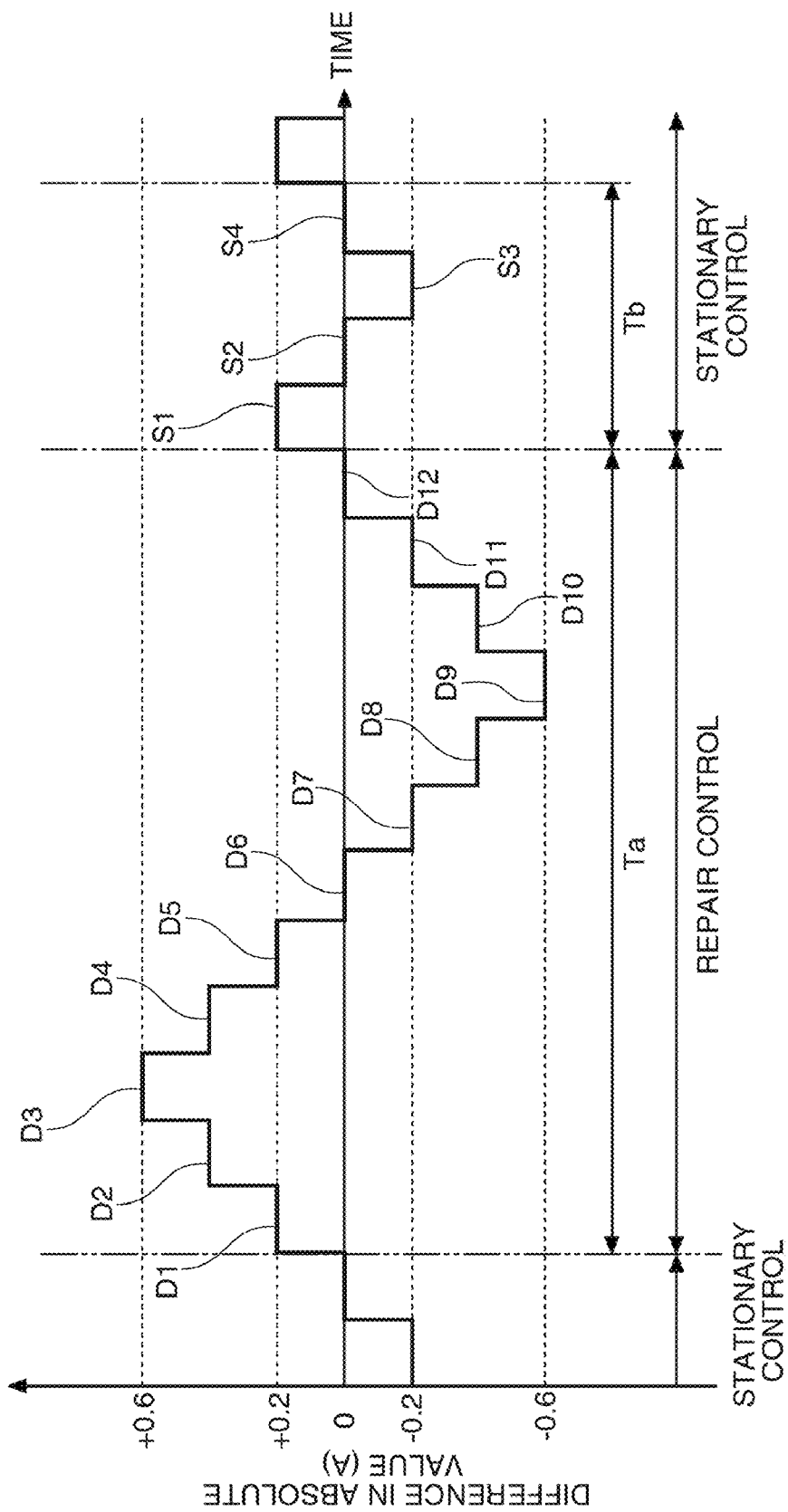
FIG. 15 is a view for explaining an exemplary control of a discharge lamp lighting device according to an embodiment of the invention.

FIG. 15 shows an example of one cycle Ta of the cyclical pattern at the time of repair control to change the difference in absolute value between the current value of the AC current I for discharge lamp driving in the first polarity section and the current value in the second polarity section and one cycle Tb of the cyclical pattern at the time of stationary control. The horizontal axis represents time. The vertical axis represents the difference in absolute value between the current value of the AC current I for discharge lamp driving in the first polarity section and the current value in the second polarity section.

In the example shown in FIG. 15, the control unit 40 carries out repair control to perform sectional current control processing to change the difference in absolute value between the current value of the AC current I for discharge lamp driving in the first polarity section and the current value in the second polarity section stepwise in the cyclical pattern of one cycle Ta, including 12 sectional periods (sectional periods D1 to D12) in the period of one cycle Ta in which the difference in absolute value between the current value of the AC current I for discharge lamp driving in the first polarity section and the current value in the second polarity section is maintained at the same value. In this embodiment, the length per sectional period of the sectional periods D1 to D12 is four seconds.

In other times than repair control, the control unit 40 carries out stationary control to perform sectional current control processing to change the difference in absolute value between the current value of the AC current I for discharge lamp driving in the first polarity section and the current value in the second polarity section stepwise in the period of one cycle Tb including four sectional periods (sectional periods S1 to S4) in which the difference in absolute value between the current value of the AC current I for discharge lamp driving in the first polarity section and the current value in the second polarity section is maintained at the same value. In this embodiment, the length per sectional period of the sectional periods S1 to S4 is four seconds.

At the time of repair control, the difference in absolute value between the current value of the AC current I for discharge lamp driving in the first polarity section and the current value in the second polarity section is +0.2 A in the sectional period D1. After that, the difference in absolute value between the current value of the AC current I for discharge lamp driving in the first polarity section and the current value in the second polarity section is increased by 0.2 A each. The difference in absolute value between the current value of the AC current I for discharge lamp driving in the first polarity section and the current value in the second polarity section is at the maximum level of +0.6 A in the sectional period D3.

After that, the difference in absolute value between the current value of the AC current I for discharge lamp driving in the first polarity section and the current value in the second polarity section is decreased by 0.2 A each. The difference in absolute value between the current value of the AC current I for discharge lamp driving in the first polarity section and the current value in the second polarity section is at the minimum level of −0.6 A in the sectional period D9. After that, the difference in absolute value between the current value of the AC current I for discharge lamp driving in the first polarity section and the current value in the second polarity section is increased by 0.2 A each. Increase and decrease of the difference in absolute value between the current value of the AC current I for discharge lamp driving in the first polarity section and the current value in the second polarity section is repeated with the cycle Ta.

At the time of stationary control, the difference in absolute value between the current value of the AC current I for discharge lamp driving in the first polarity section and the current value in the second polarity section is at the maximum of +0.2 A in the sectional period S1. After that, the difference in absolute value between the current value of the AC current I for discharge lamp driving in the first polarity section and the current value in the second polarity section is decreased by 0.2 A each. The difference in absolute value between the current value of the AC current I for discharge lamp driving in the first polarity section and the current value in the second polarity section is at the minimum of −0.2 A in the sectional period S3. After that, the difference in absolute value between the current value of the AC current I for discharge lamp driving in the first polarity section and the current value in the second polarity section is increased by 0.2 A each. Increase and decrease of the difference in absolute value between the current value of the AC current I for discharge lamp driving in the first polarity section and the current value in the second polarity section is repeated with the cycle Tb.

With such control, heat load on the electrodes of the discharge lamp can be reduced at the time of stationary control, compared to the time of repair control.

Also in stationary control, the difference in absolute value between the current value of the AC current I for discharge lamp driving in the first polarity section and the current value in the second polarity section is changed in the cyclical pattern including plural sectional periods in which the difference in absolute value between the current value of the AC current I for discharge lamp driving in the first polarity section and the current value in the second polarity section is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period. Therefore, also in stationary driving, the thermal state of the two electrodes and their peripheries can be largely varied on a relatively long time scale. Thus, the electrode temperature can be properly changed and uneven wear of the electrodes and uneven precipitation of the electrode material can be restrained.

Moreover, by repair control, unwanted protrusions on the electrodes that cannot be melted at the time of stationary control can be melted. Thus, occurrence of flicker can be restrained.

Second Modification

In the above embodiment, the control unit 40 carries out repair control in periodical timing. However, the control unit 40 including a flicker detecting unit that detects flicker in accordance with a discharge lamp driving voltage may carry out repair control based on flicker detection timing of the flicker detecting unit.

Moreover, for example, the control unit 40 may determine a flicker generating electrode in accordance with flicker detection timing of the flicker detecting unit and carry out repair control to change the difference in absolute value between the current value of the AC current I for discharge lamp driving in the first polarity section and the current value in the second polarity section in a cyclical pattern to increase the DC current Id outputted from the power control circuit 20 in the section where the flicker generating electrode is the anode.

The example of the method for determining occurrence of flicker by the flicker detecting unit and the method for determining the flicker generating electrode is already described with reference to FIG. 8A and FIG. 8B. The exemplary control flow when flicker is generated is already described with reference to FIG. 9. Therefore, these will not be described further in detail.

Figure 16:
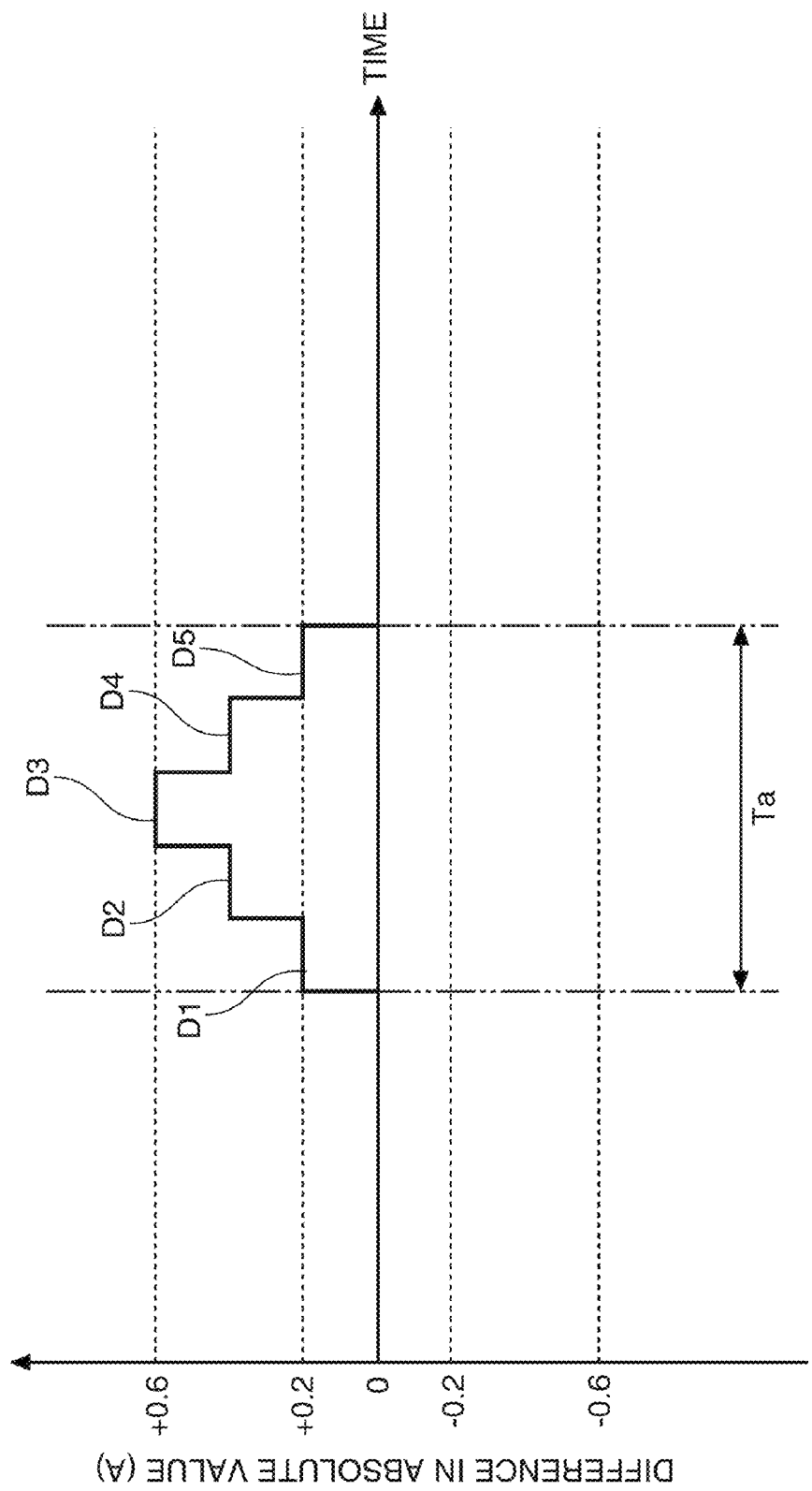
FIG. 16 is a view for explaining an exemplary control of a discharge lamp lighting device according to an embodiment of the invention.

FIG. 16 shows an exemplary cyclical pattern to change the difference in absolute value between the current value of the AC current I for discharge lamp driving in the first polarity section and the current value in the second polarity section in the case where flicker is generated at the first electrode of the discharge lamp 90 (that is, in the case of repair control for the first electrode). The horizontal axis represents time. The vertical axis represents the difference in absolute value between the current value of the AC current I for discharge lamp driving in the first polarity section and the current value in the second polarity section.

In sectional periods D1 to D4, the control unit 40 carries out sectional current control processing to control the difference in absolute value between the current value of the AC current I for discharge lamp driving in the first polarity section and the current value in the second polarity section in a cyclical pattern to increase the DC current Id outputted from the power control circuit 20 in the section where the first electrode as the flicker generating electrode is the anode (repair control for the first electrode).

As the difference in absolute value between the current value of the AC current I for discharge lamp driving in the first polarity section and the current value in the second polarity section is thus controlled in a cyclical pattern to increase the DC current Id outputted from the power control circuit 20 in the section where the first electrode as the flicker generating electrode is the anode, heat load on the second electrode where no flicker is generated, that is, heat load on the electrode that is not worn, can be reduced. Moreover, unwanted protrusions on the flicker generating electrode can be melted by repair control. Thus, occurrence of flicker can be restrained.

If flicker is generated at the second electrode of the discharge lamp 90 (that is, in the case of repair control for the second electrode), the control unit 40 carries out sectional current control processing to control the difference in absolute value between the current value of the AC current I for discharge lamp driving in the first polarity section and the current value in the second polarity section in a cyclical pattern to increase the DC current Id outputted form the power control circuit 20 in the section where the second electrode as the flicker generating electrode is the anode (repair control for the second electrode).

In addition to this modification, the control unit 40 can also combine stationary control to control the difference in absolute value between the current value of the AC current I for discharge lamp driving in the first polarity section and the current value in the second polarity section in a cyclical pattern in other times than repair control.

With such control, in addition to the reduction in heat load on the electrode where no flicker is generated, that is, heat load on the electrode that is not worn, heat load on the electrodes of the discharge lamp can be reduced at the time of stationary control, compared to the time of repair control.

Also in stationary control, the difference in absolute value between the current value of the AC current I for discharge lamp driving in the first polarity section and the current value in the second polarity section is changed in the cyclical pattern including plural sectional periods in which the difference in absolute value between the current value of the AC current I for discharge lamp driving in the first polarity section and the current value in the second polarity section is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period. Therefore, also in stationary driving, the thermal state of the two electrodes and their peripheries can be largely varied on a relatively long time scale. Thus, the electrode temperature can be properly changed and uneven wear of the electrodes and uneven precipitation of the electrode material can be restrained.

Moreover, by repair control, unwanted protrusions on the electrode that cannot be melted at the time of stationary control can be melted. Thus, occurrence of flicker can be prevented.

Third Modification

In the first modification, the control unit 40 carries out repair control in the cyclical pattern including sectional periods with the same time length per sectional period as in stationary control. However, in the third modification, the control unit 40 may carry out repair control in a cyclical pattern including a sectional period having a shorter time length per sectional period than in stationary control.

Figure 17:
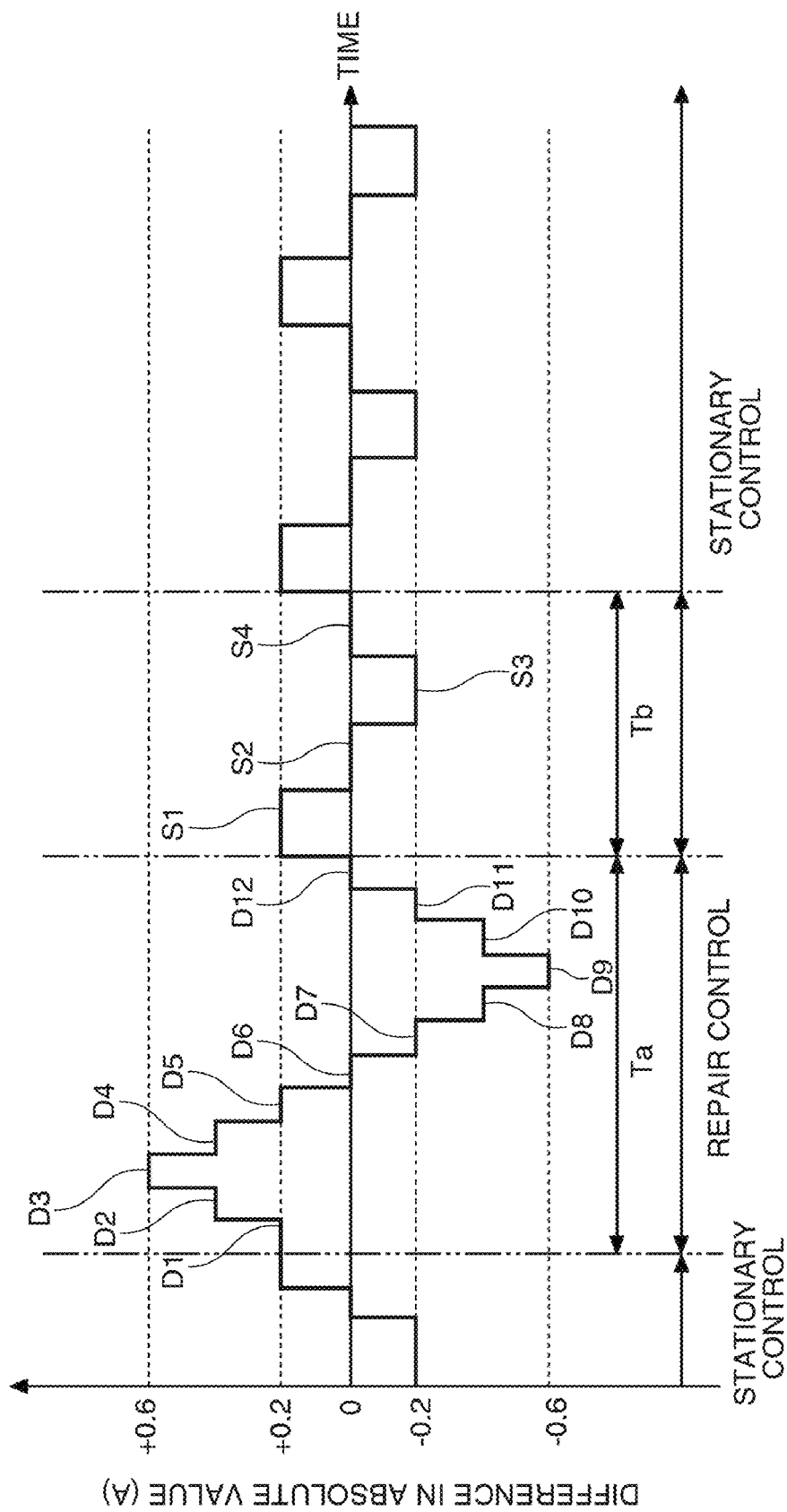
FIG. 17 is a view for explaining an exemplary control of a discharge lamp lighting device according to an embodiment of the invention.

FIG. 17 shows an example of one cycle Ta of a cyclical pattern in repair control and one cycle Tb of a cyclical pattern in stationary control to change the difference in absolute value between the current value of the AC current I for discharge lamp driving in the first polarity section and the current value in the second polarity section. The horizontal axis represents time. The vertical axis represents the difference in absolute value between the current value of the AC current I for discharge lamp driving in the first polarity section and the current value in the second polarity section.

The control at the time of stationary control is similar to the example described with reference to FIG. 15. However, the control at the time of repair control is different in that the length per sectional period of the sectional periods D1 to D12 is two seconds, which is shorter than the length per sectional period of the sectional periods S1 to S4, that is, four seconds.

In this manner, as repair control to change the difference in absolute value between the current value of the AC current I for discharge lamp driving in the first polarity section and the current value in the second polarity section in a shorter time than at the time of stationary control is combined, heat load on the electrodes of the discharge lamp can be reduced at the time of stationary control, compared to the time of repair control. Moreover, also in stationary driving, unwanted protrusions on the electrodes that cannot be melted in stationary control can be melted more efficiently in repair driving.

At the electrode having a smaller current value in the section where this electrode is the anode (in the example of FIG. 17, the second electrode), the temperature falls and flicker tends to occur. However, as the time per sectional period of the sectional periods D1 to D12 is made shorter, the low-temperature period of the electrode can be reduced. Thus, occurrence of flicker can be restrained.

The timing when the control unit 40 carries out repair control may be periodical timing. Alternatively, the control unit 40 may carry out repair control based on flicker detection timing of the flicker detecting unit, as in the second modification.

With such control, in addition to the reduction in heat load on the electrode where no flicker is generated, that is, heat load on the electrode that is not worn, heat load on the electrodes of the discharge lamp can be reduced at the time of stationary control, compared to the time of repair control.

Also in stationary control, the difference in absolute value between the current value of the AC current I for discharge lamp driving in the first polarity section and the current value in the second polarity section is changed in the cyclical pattern including plural sectional periods in which the difference in absolute value between the current value of the AC current I for discharge lamp driving in the first polarity section and the current value in the second polarity section is maintained at the same value over plural cycles of the AC current I for discharge lamp driving. Therefore, while the cumulative energy supplied to each electrode of the discharge lamp 90 in one cycle of the AC current I is changed in the cyclical pattern having plural sectional periods, the cumulative energy supplied to each electrode of the discharge lamp 90 in one cycle of the AC current I can be temporarily fixed in at least one sectional period. Therefore, also in stationary driving, the thermal state of the two electrodes and their peripheries can be largely varied on a relatively long time scale. Thus, the electrode temperature can be properly changed and uneven wear of the electrodes and uneven precipitation of the electrode material can be restrained.

Moreover, by repair control, unwanted protrusions on the electrodes that cannot be melted at the time of stationary control can be melted more efficiently. Thus, occurrence of flicker can be prevented.

Other Modifications

For example, in the above description of the embodiment, the current value is constant within the polarity inversion timing section. However, the control unit 40 may carry out sectional current control processing in which the current value of the DC current Id in the polarity inversion timing section is at maximum in the latter half of the polarity inversion timing section.

The control unit 40 may also carry out sectional current control processing in which the current value of the DC current Id is monotonically increased within the polarity inversion timing section.

With combinations of such controls, unwanted protrusions on the electrodes can be melted more efficiently in repair control. Thus, occurrence of flicker can be restrained more effectively.

4. Circuit Configuration of Projector

Figure 18:
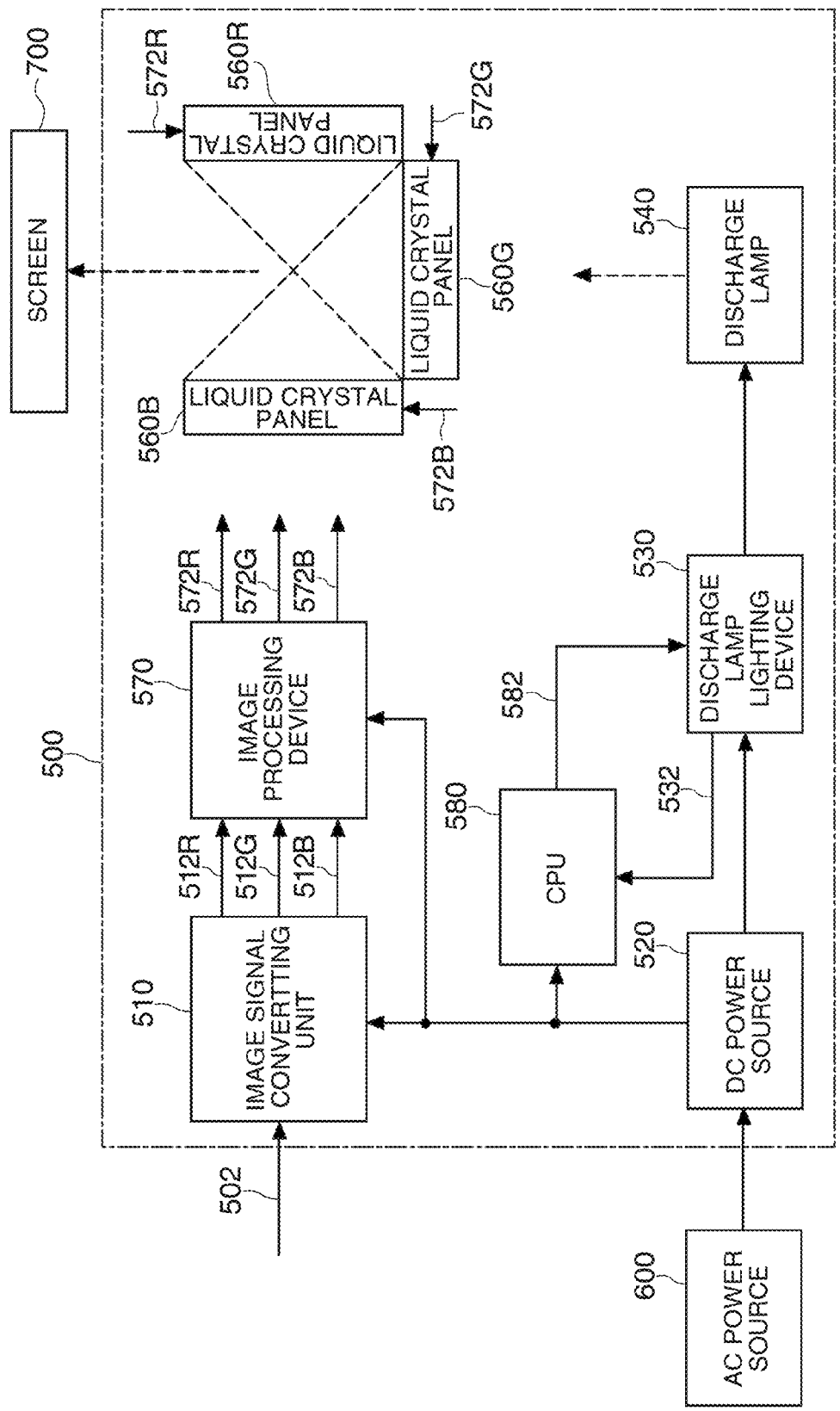
FIG. 18 is a view for explaining an exemplary configuration of a projector according to an embodiment of the invention.

FIG. 18 shows an exemplary circuit configuration of a projector according to this embodiment. A projector 500 includes an image signal converting unit 510, a DC power source 520, a discharge lamp lighting device 530, a discharge lamp 540, liquid crystal panels 560R, 560G and 560B, and an image processing device 570, in addition to the previously described optical system.

The image signal converting unit 510 converts an image signal 502 inputted from outside (luminance-color difference signal, analog RGB signal or the like) to a digital RGB signal with a predetermined word length, thus generates image signals 512R, 512G and 512B, and supplies these image signals to the image processing device 570.

The image processing device 570 carries out image processing to each of the three image signals 512R, 512G and 512B and outputs driving signals 572R, 572G and 572B to drive the liquid crystal panels 560R, 560G and 560B, respectively.

The DC power source 520 converts an AC voltage supplied from an external AC power source 600 to a constant DC voltage, and supplies the DC voltage to the image signal converting unit 510 and the image processing device 570, which are situated on the secondary side of a transformer (not shown, but included in the DC power source 520), and to the discharge lamp lighting device 530, which is situated on the primary side of the transformer.

The discharge lamp lighting device 530 generates a high voltage between the electrodes of the discharge lamp 540 at the time of startup, thus causes dielectric breakdown and forms a discharge path. After that, the discharge lamp lighting device 530 supplies a driving current to maintain discharge of the discharge lamp 540. In this embodiment, a discharge lamp lighting device having the same configuration as discharge lamp lighting device 10 described with reference to FIG. 1 is used.

The liquid crystal panels 560R, 560G and 560B modulate the luminance of color light beams that become incident on the respective liquid crystal panels in accordance with the driving signals 572R, 572G and 572B corresponding to their respective image signals.

A CPU 580 controls operations from the lighting start to the light-out of the projector. When the power of the projector is turned on and the output voltage of the DC power source 520 reaches a predetermined value, the CPU 580 generates and supplies a lighting signal 582 to the discharge lamp lighting device 530. The CPU 580 may receive lighting information 532 of the discharge lamp 540 from the discharge lamp lighting device 530.

In the projector 500 having such a configuration, flicker of the discharge lamp 540 can be restrained while heat load on the electrodes of the discharge lamp 540 is reduced. Therefore, a projector having the discharge lamp 540 with a longer life can be realized.

Modifications

A flicker detecting unit that detects flicker in accordance with the light quantity of the discharge lamp may be additionally included in the above exemplary configuration of the projector. The control unit 40 of the discharge lamp lighting device 530 may carry out repair control based on flicker detection timing of the flicker detecting unit.

In this modification, the flicker detecting unit that detects flicker in accordance with the light quantity of the discharge lamp is included in the projector. However, the flicker detecting unit may be included in the discharge lamp lighting device 530.

The flicker detecting unit may be realized, for example, by combining the control unit 40, a light quantity sensor arranged near the liquid crystal panels 560R, 560G and 560B or near the screen 700, and a camera that picks up an image of a video projected on the screen 700.

In this case, for example, the control unit 40 may determine that flicker is generated in the discharge lamp 540 if the light quantity of the discharge lamp 540 falls below a predetermined value.

The control unit 40 may also determine that the electrode which serves as the cathode in flicker detection timing is the flicker generating electrode.

In the projector 500 with such a configuration, flicker in the discharge lamp 540 can be restrained while heat load on the electrodes of the discharge lamp 540 can be further reduced. Therefore, a projector having the discharge lamp 540 with a longer life can be realized.

In the above embodiments, the projector having three liquid crystal panels is used as an example. However, the invention is not limited to this and can be applied to a projector having one, two, or four or more liquid crystal panels.

In the above embodiments, the transmission-type projector is used as an example. However, the invention is not limited to this and can be applied to a reflection-type projector. Here, the "transmission-type" refers to a type in which an electro-optical modulation device as a light modulating unit transmits light like a transmission-type liquid crystal panel. The "reflection-type" refers to a type in which an electro-optical modulation device as a light modulating unit reflects light like a reflection-type liquid crystal panel or micromirror-type light modulation device. As a micromirror-type modulation device, for example, DMD (Digital Micromirror Device, trademark of Texas Instruments) can be used. Also in the case where the invention is applied to a reflection-type projector, the similar effects as a transmission-type projector can be achieved.

The invention can also be applied to a front projection-type projector that projects a projection image from the observing side, and to a rear projection-type projector that projects a projection image from the opposite side of the observing side.

The invention is not limited to the above embodiments and various modifications can be made without departing from the scope of the invention.

The invention includes substantially the same configuration as the configuration described in the embodiments (for example, a configuration that realize the same function, method and result, or a configuration that realizes the same purpose and effect). The invention also includes the configuration described in the embodiments but in which unessential parts are replaced. The invention also includes a configuration that realizes the same functional effect or the same purpose as the configuration described in the embodiment. The invention also includes the configuration described in the embodiments with a traditional technique added thereto.

The entire disclosure of Japanese Patent Application No. 2008-071834, filed Mar. 19, 2008 is expressly incorporated by reference herein.

What is claimed is:

1. A discharge lamp lighting device comprising:
a power control circuit that outputs a DC current;
an AC converter circuit to which the DC current is inputted, the AC conversion circuit inverting polarity of the DC current between first polarity and second polarity in predetermined timing, and thereby generates and outputs an AC current for discharge lamp driving; and
a control unit that carries out AC conversion control, current control and repair control, the AC conversion control processing to the AC converter circuit to control polarity inversion timing of the AC current for discharge lamp driving, the current control processing to the power control circuit to control a current value of the DC current, the repair control changing, in a first cyclical pattern, cumulative energy supplied to each electrode of a discharge lamp during one cycle of the AC current for discharge lamp driving, in predetermined timing, the first cyclical pattern including plural sectional periods in which the cumulative energy is maintained at the same value over plural cycles of the AC current for discharge lamp driving, and the cumulative energy differs between at least two of the sectional periods.

2. A discharge lamp lighting device comprising:
a power control circuit that outputs a DC current;
an AC converter circuit to which the DC current is inputted, the AC converter circuit inverting polarity of the DC current between first polarity and second polarity in predetermined timing, and thereby generates and outputs an AC current for discharge lamp driving; and
a control unit that carries out AC conversion control, current control and repair control, the AC conversion control processing to the AC converter circuit to control a duty ratio by polarity inversion timing of the AC current for discharge lamp driving, the current control processing to the power control circuit to control a current value of the DC current, the repair control conducting the current control processing to change, in a first cyclical pattern, a duty ratio that is a proportion of time of the first polarity in one cycle of the AC current for discharge lamp driving, in predetermined timing, the first cyclical pattern including plural sectional periods in which the duty ratio is maintained at the same value over plural cycles of the AC current for discharge lamp driving, and the duty ratio differs between at least two of the sectional periods.

3. A discharge lamp lighting device comprising:
a power control circuit that outputs a DC current;
an AC converter circuit to which the DC current is inputted, the AC converter circuit inverting polarity of the DC current between first polarity and second polarity in predetermined timing, and thereby generates and outputs an AC current for discharge lamp driving; and
a control unit that carries out AC conversion control, sectional current control and repair control, the AC conversion control processing to the AC converter circuit to control polarity inversion timing of the AC current for discharge lamp driving, the sectional current control processing to the power control circuit to control a current value of the DC current in accordance with the polarity inversion timing section the repair control conducting the sectional current control processing to change, in a first cyclical pattern, a difference in absolute value between a current value in a first polarity section and a current value in a second polarity section of the AC current for discharge lamp driving, in predetermined timing, the first cyclical pattern including plural sectional periods in which the difference in absolute value between the current value in the first polarity section and the current value in the second polarity section of the AC current for discharge lamp driving is maintained at the same value over plural cycles of the AC current for discharge lamp driving, and the difference in absolute value between the current value in the first polarity section and the current value in the second polarity section of the AC current for discharge lamp driving differs between at least two of the sectional periods.

4. The discharge lamp lighting device according to claim 1, wherein in other cases than the time of the repair control, the control unit carries out stationary control to control magnitude of the cumulative energy in a second cyclical pattern, whereas in the repair control, the control unit controls magnitude of the cumulative energy in the first cyclical pattern in which a difference between a maximum value and a minimum value of the cumulative energy is greater than in the stationary control.

5. The discharge lamp lighting device according to claim 2, wherein in other cases than the time of the repair control, control unit carries out stationary control to control the duty ratio in a second cyclical pattern, whereas in the repair control, the control unit controls the duty ratio in the first cyclical pattern in which a difference between a maximum value and a minimum value of the duty ratio is greater than in the stationary control.

6. The discharge lamp lighting device according to claim 3, wherein in other cases than the time of repair control, the control unit carries out stationary control to control, in a second cyclical pattern, the difference in absolute value between the current value in the first polarity section and the current value in the second polarity section of the AC current for discharge lamp driving, whereas in the repair control, the control unit controls the difference between the current value in the first polarity section and the current value in the second polarity section of the AC current for discharge lamp driving, in the first cyclical pattern in which a difference between a maximum value and a minimum value of the difference in absolute value between the current value in the first polarity section and the current value in the second polarity section of the AC current for discharge lamp driving is greater than in the stationary control.

7. The discharge lamp lighting device according to claim 4, wherein the control unit carries out the repair control in the cyclical pattern including a sectional period of a shorter time than the time per sectional period in the stationary control.

8. The discharge lamp lighting device according to claim 1, wherein the control unit carries out the repair control in periodical timing.

9. The discharge lamp lighting device according to claim 1, further comprising a flicker detecting unit that detects flicker in accordance with a discharge lamp driving voltage,
wherein the control unit carries out the repair control based on flicker detection timing of the flicker detecting unit.

10. The discharge lamp lighting device according to claim 9, wherein the control unit determines a flicker generating electrode in accordance with the flicker detection timing of the flicker detecting unit, and carries out the repair control to change the cumulative energy supplied when the flicker generating electrode is an anode, in the cyclical pattern to increase the cumulative energy.

11. The discharge lamp lighting device according to claim 1, further comprising a flicker detecting unit that detects flicker in accordance with light quantity of the discharge lamp,
wherein the control unit carries out the repair control in accordance with flicker detection timing of the flicker detecting unit.

12. The discharge lamp lighting device according to claim 1, wherein the control unit carries out sectional current control processing in which the current value of the DC current in the polarity inversion timing section is at maximum in the latter half of the polarity inversion timing section.

13. The discharge lamp lighting device according to claim 1, wherein the control unit carries out sectional current control processing in which the current value of the DC current is monotonically increased within the polarity inversion timing section.

14. A control method for a discharge lamp lighting device including:
a power control circuit that outputs a DC current; and
an AC converter circuit to which the DC current is inputted, the AC converter circuit repeating polarity inversion of the DC current between first polarity and second polarity in predetermined timing and thereby generates and outputs an AC current for discharge lamp driving;
the method comprising:
carrying out AC conversion control processing to the AC conversion circuit to control polarity inversion timing of the AC current for discharge lamp driving;
carrying out current control processing to the power control circuit to control a current value of the DC current; and
carrying out repair control to change, in a first cyclical pattern, cumulative energy supplied to each electrode of the discharge lamp during one cycle of the AC current for discharge lamp driving, in predetermined timing, the first cyclical pattern including plural sectional periods in which the cumulative energy is maintained at the same value over plural cycles of the AC current for discharge lamp driving, and the cumulative energy differs between at least two of the sectional periods.

15. A projector comprising the discharge lamp lighting device according to claim 1.

* * * * *